US011026368B2

(12) United States Patent
Fay, II et al.

(10) Patent No.: US 11,026,368 B2
(45) Date of Patent: Jun. 8, 2021

(54) STEERING CONTROL SYSTEM FOR HARVESTER AND METHODS OF USING THE SAME

(71) Applicant: CNH INDUSTRIAL AMERICA LLC, New Holland, PA (US)

(72) Inventors: Jeffrey Brown Fay, II, Oxford, PA (US); Mark Dean Layton, Lititz, PA (US); Steven C. Young, Lancaster, PA (US); Gregory Fasick, Hatfield, PA (US); Madhu Pankaj, West Chester, PA (US); Robert Fackler, Ephrata, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 263 days.

(21) Appl. No.: 16/200,324

(22) Filed: Nov. 26, 2018

(65) Prior Publication Data

US 2020/0163278 A1 May 28, 2020

(51) Int. Cl.

| | |
|---|---|
| ***A01B 69/04*** | (2006.01) |
| ***A01D 41/127*** | (2006.01) |
| ***A01B 73/00*** | (2006.01) |
| *A01D 101/00* | (2006.01) |

(52) U.S. Cl.

CPC ........ *A01D 41/1278* (2013.01); *A01B 69/008* (2013.01); *A01B 73/00* (2013.01); *A01D 2101/00* (2013.01)

(58) Field of Classification Search

CPC ............ A01D 41/1278; A01D 2101/00; A01B 69/008; A01B 73/00; B62D 5/06

See application file for complete search history.

(56) References Cited

U.S. PATENT DOCUMENTS

| | | | | |
|---|---|---|---|---|
| 2,886,016 A | 5/1959 | Ashton | | |
| 3,392,797 A | 7/1968 | Gibson et al. | | |
| 3,731,758 A | 5/1973 | Hibma | | |
| 5,355,664 A * | 10/1994 | Zenner | A01D 34/82 | 16/35 D |
| 7,147,241 B2 | 12/2006 | Beaujot et al. | | |
| 7,389,849 B2 * | 6/2008 | Williams | B62D 5/09 | 180/417 |
| 8,496,256 B2 * | 7/2013 | Bebernes | B62D 11/24 | 280/86 |
| 8,690,171 B2 * | 4/2014 | Clark | B62D 17/00 | 280/86.751 |
| 8,925,672 B2 * | 1/2015 | Bebernes | B62D 5/093 | 180/403 |
| 9,439,341 B2 * | 9/2016 | Bebernes | A01B 69/007 | |
| 9,463,837 B1 | 10/2016 | Li | | |
| 2018/0186207 A1 | 7/2018 | Fay, II et al. | | |
| 2019/0047541 A1 * | 2/2019 | Dockter | A01B 69/008 | |

* cited by examiner

*Primary Examiner* — Minnah L Seoh
*Assistant Examiner* — Hosam Shabara
(74) *Attorney, Agent, or Firm* — Peter Zacharias; Patrick Sheldrake

(57) ABSTRACT

The disclosure relates to a steering control system useful for providing stable control during high-speed operation of harvesters, such as self-propelled windrowers. The steering control system utilizes a sensor for detecting and regulating a position of a single steering cylinder associated with a first caster, a damper being free of sensing and providing passive damping to the second caster.

20 Claims, 20 Drawing Sheets

100 112 176 172 178 170 130 134 146 166 156 158 174 144 122 106 148 152 150 124 136 138 132 160 164 162 168 118 142 140 154 120

STEERING CONTROL SYSTEM FOR HARVESTER AND METHODS OF USING THE SAME

BACKGROUND

Harvesters such as windrowers, tractors, and forage harvesters, have to operate effectively in different operational modes (e.g., normal operation mode, in-field operation mode, high-speed operation mode, or the like). Typical construction for such vehicles include front ground wheels mounted on the frame at fixed angles parallel to each other and parallel to a center line of the frame and rear ground wheels mounted on a respective caster. Each of the front ground wheels is typically driven by a respective drive motor which allows variable speed in both the forward and reverse directions such that steering of the tractor is effected by a differential in speed between the front wheels with the rear wheels following the steering in a castering action.

Conventional harvesters generally use dual path steering for both in-field operation mode and high-speed road transport operation mode. Dual path steering generally operates by varying the speed of the two front drive wheels in order to steer the harvester. The left wheel slows while the right wheel speeds up to turn left, while the right wheel slows and the left wheel speeds up to turn right. Combined with passively castering rear wheels, this enables the conventional harvester to perform zero radius spin turns in the field, which is desirable for optimum field efficiency and maneuverability. However, during high-speed road transport operation mode (e.g., speeds greater than 24 mph) dual path steering does not provide adequate steering stability. This is due to several factors, including variable ground drive motor/pump efficiency, lack of steering feedback to the driver, dynamics of the harvester which uses the front wheels to steer with no stabilizing effect provided by the rear wheels, combinations thereof, or the like.

SUMMARY

The disclosure relates to a steering control system for a harvester that provides for stable operation during high-speed rear axle steering (e.g., road operation mode). The steering control system includes a position sensor detecting the position of a single steering cylinder associated with one caster of the windrower. Based on input from a steering wheel or device, the steering cylinder is actuated to extend or retract to steer one caster of the windrower, with the second caster providing passive damping. In some embodiments, steering cylinders are provided on both casters with the position of only one steering cylinder detected by a sensor. In such embodiments, actuation of a first steering cylinder to extend or retract results in an equal and opposite actuation of the second steering cylinder, thereby providing steering on both casters. Steering of one or both casters provides additional stability to the windrower during the road operation mode.

In accordance with some embodiments of the present disclosure, an exemplary steering control system for a harvester is provided. The steering control system includes a first cylinder configured to be coupled to a rear axle of the harvester at one end and an upright shaft of a first caster of the harvester at an opposing end. The steering control system includes a sensor associated with the first cylinder and in communication with a controller, the sensor detecting a position of the first cylinder. The steering control system includes a passive damper configured to be coupled to the rear axle of the harvester at one end and an upright shaft of a second caster of the harvester at an opposing end. In a road operation mode, the first cylinder is actuated by the controller to extend or retract to control steering of the first caster, and the sensor transmits data to the controller regarding the detected position of the first cylinder. The passive damper is free of sensing and provides passive damping to the second caster.

One end of the first cylinder is configured to be coupled to the rear axle of the harvester by a flange. In some embodiments, the first cylinder is hydraulically plumbed to a steering proportional valve for actuation of the first cylinder to extend or retract. The steering proportional valve is hydraulically plumbed to both a rod end and a barrel end of the first cylinder. The detected position of the first cylinder is representative of a position of the first caster relative to the rear axle of the harvester.

In some embodiments, the steering control system includes a proximity sensor configured to detect a position of the first caster relative to the rear axle of the harvester. Castering of second caster is unaffected by actuation of the first cylinder to extend or retract. In some embodiments, the sensor is at least one of an internal position sensor, an external position sensor, a potentiometer, or the like. In a field operation mode, free flow of hydraulic fluid into and out of the first cylinder provides passive damping by the first cylinder to the first caster.

In accordance with embodiments of the present disclosure, an exemplary steering control system for a harvester is provided. The steering control system includes a first cylinder configured to be coupled to a rear axle of the harvester at one end and an upright shaft of a first caster of the harvester at an opposing end. The steering control system includes a sensor associated with the first cylinder and in communication with a controller, the sensor detecting a position of the first cylinder. The steering control system includes a second cylinder configured to be coupled to the rear axle of the harvester at one end and an upright shaft of a second caster of the harvester at an opposing end. In a road operation mode, the first cylinder is actuated by the controller to extend or retract to control steering of the first caster, and the sensor transmits data to the controller regarding the detected position of the first cylinder. The second cylinder is free of sensing and is hydraulically coupled to the first cylinder to move in an equal and opposite direction of the first cylinder to control steering of the second caster.

In some embodiments, barrel ports of the first and second cylinders are hydraulically coupled together, and rod ports of the first and second cylinders are hydraulically coupled to a steering proportional valve. Actuation of the first cylinder to retract displaces fluid from a barrel end of the first cylinder into a barrel end of the second cylinder. Displacement of the fluid into the barrel end of the second cylinder actuates the second cylinder to extend in an equal magnitude to retraction of the first cylinder.

In some embodiments, the detected position of the first cylinder is representative of a position of the first and second casters relative to the rear axle of the harvester. In some embodiments, the steering control system includes a proximity sensor configured to detect a position of the first caster or second caster relative to the rear axle of the harvester. In some embodiments, the sensor is at least one of an internal position sensor, an external position sensor, a potentiometer, or the like. In a field operation mode, free flow of hydraulic fluid into and out of the first and second cylinders provides passive damping by the first cylinder to the first caster and the second cylinder to the second caster.

In accordance with embodiments of the present disclosure, an exemplary harvester is provided. The harvester includes a frame, at least one front axle comprising first and second front wheels pivotally mounted to the front axle, at least one rear axle comprising first and second casters pivotally mounted to the rear axle, and a steering control system. The steering control system includes a first cylinder coupled to the rear axle at one end and an upright shaft of the first caster at an opposing end. The steering control system includes a sensor associated with the first cylinder and in communication with a controller, the sensor detecting a position of the first cylinder. The steering control system includes a passive damper coupled to the rear axle at one end and an upright shaft of the second caster at an opposing end. In a road operation mode, the first cylinder is actuated by the controller to extend or retract to control steering of the first caster, and the sensor transmits data to the controller regarding the detected position of the first cylinder. The passive damper is free of sensing and provides passive damping to the second caster. Castering of second caster is unaffected by actuation of the first cylinder to extend or retract.

In accordance with embodiments of the present disclosure, an exemplary harvester is provided. The harvester includes a frame, at least one front axle comprising first and second front wheels pivotally mounted to the front axle, at least one rear axle comprising first and second casters pivotally mounted to the rear axle, and a steering control system. The steering control system includes a first cylinder coupled to the rear axle at one end and an upright shaft of the first caster at an opposing end. The steering control system includes a sensor associated with the first cylinder and in communication with a controller, the sensor detecting a position of the first cylinder. The steering control system includes a second cylinder coupled to the rear axle at one end and an upright shaft of the second caster at an opposing end. In a road operation mode, the first cylinder is actuated by the controller to extend or retract to control steering of the first caster, and the sensor transmits data to the controller regarding the detected position of the first cylinder. The second cylinder is free of sensing and is hydraulically coupled to the first cylinder to move in an equal and opposite direction of the first cylinder to control steering of the second caster.

In accordance with embodiments of the present disclosure, an exemplary method of steering a harvester is provided. The method includes coupling a first cylinder to a rear axle of the harvester at one end and an upright shaft of a first caster of the harvester at an opposing end. The method includes associating a sensor with the first cylinder, the sensor in communication with a controller and detecting a position of the first cylinder. The method includes coupling a passive damper to the rear axle of the harvester at one end and an upright shaft of a second caster of the harvester at an opposing end, the passive damper being free of sensing. In a road operation mode, the method includes actuating the first cylinder by the controller to extend or retract to control steering of the first caster, and transmitting data to the controller regarding the detected position of the first cylinder. The method includes providing passive damping to the second caster with the passive damper.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed steering control systems, reference is made to the accompanying figures, wherein.

DETAILED DESCRIPTION

Figure 1:
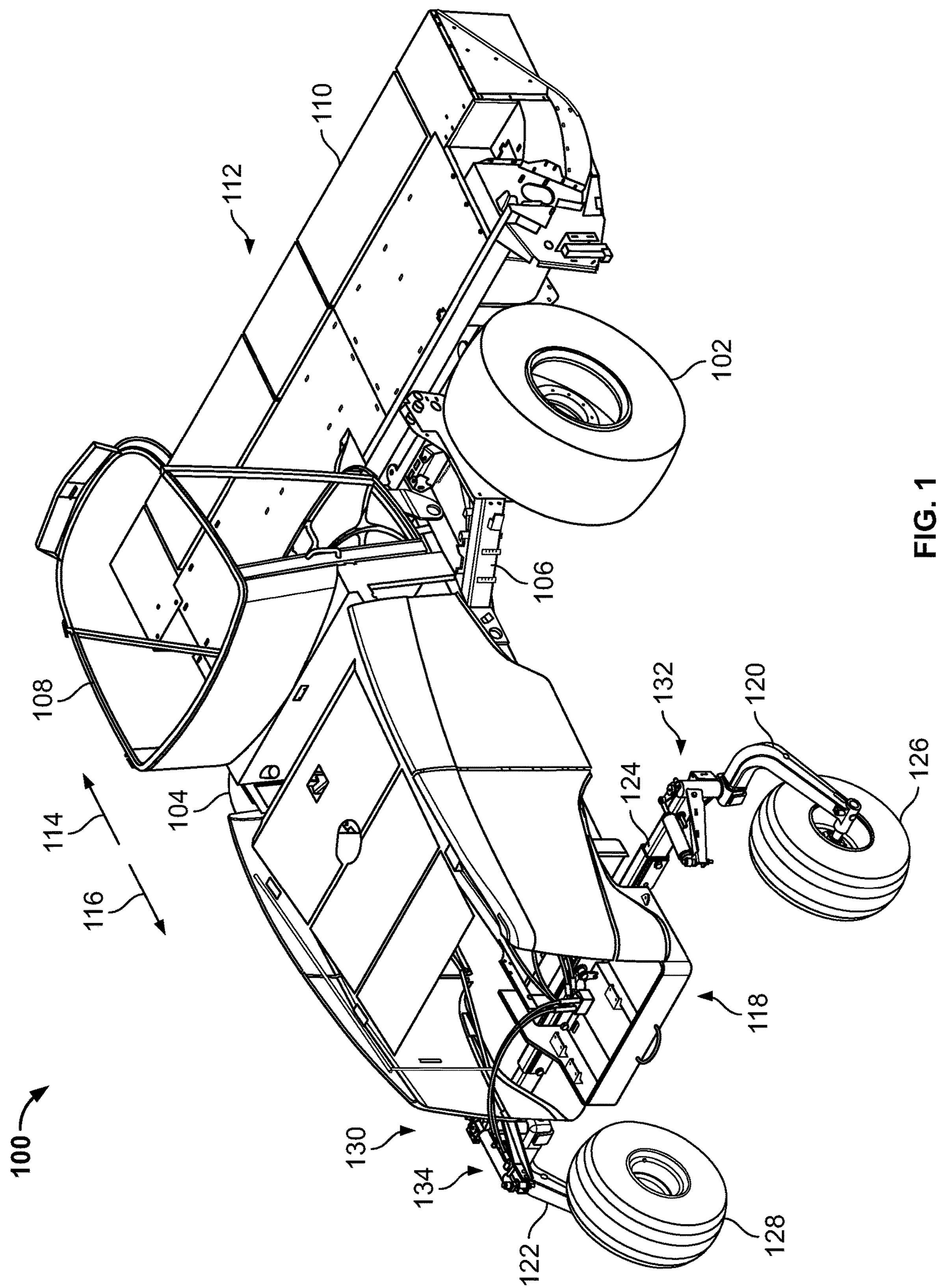
FIG. 1 is a perspective view of a windrower with an exemplary steering control system of the present disclosure.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms “a,” “an,” and “the” include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" or "steering system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator steering of the harvester. In some embodiments, the disclosure also relates to a computer software product with executable code that automatically toggles between or through different hydraulic states based on operator steering of the harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about steering of the harvester. In some embodiments, the system includes one or a plurality of sensors to detect the steering selected by the operator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the steering of the harvester. In some embodiments, the system may be configured by the operator to transition the harvester between different hydraulic states in synchrony or substantial synchrony to operator-initiated steering of the harvester. In some embodiments, the data processing system of the harvester transitions the harvester between different hydraulic states in synchrony or substantial synchrony to operator-initiated steering of the harvester depending upon real-time information sent to a controller by a sensor that monitors the steering wheel actuation.

The term "real-time" and the phrase "in real-time" as used herein are defined as a way of describing a process, event, or action that occurs simultaneously with the process of actively operating a harvester. In some embodiments, various sensors continuously sense information about the steering operation of the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a self-propelled windrower, a forage harvester, cotton harvester or a lawn mower. Embodiments of the present disclosure are particularly well suited, but in no way limited to, use with any vehicle with a front and rear steer system.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers. In some embodiments, sensors can be used to determine that the caster cylinders are fully retracted or extended.

FIG. 1 shows a perspective view of an exemplary windrower 100. The windrower 100 generally includes front wheels 102, 104 rotatably mounted to a frame 106. The windrower 100 includes a cabin 108 mounted to the frame 106. The cabin 108 is configured and dimensioned to receive an operator, and has a plurality of controls for operation of the windrower 100, such as controlling a header 110 attachable to the front 112 of the windrower 100, controlling movement of the windrower in a forward direction 114, and controlling movement of the windrower 100 in a reverse direction 116.

At the rear 118, the windrower 100 includes casters 120, 122 rotatably mounted on opposing sides of a rear axle 124 of the frame 106. The windrower 100 includes two independent caster wheels 126, 128 mounted to the respective casters 120, 122, one on the left-hand side and one on the right-hand side of the windrower 100. The windrower includes a steering control system 130 including a damping assembly 132 (e.g., a passive damper, shock absorbers, or the like) and a steering assembly 134 (e.g., a hydraulic steering cylinder) mounted to the frame 106. As will be discussed in greater detail below, the damping assembly 132 provides damping functionality to one of the casters 120, 122, and the steering control system 130 provides steering functionality to the other caster 120, 122. As such, only one of the casters 120, 122 is damped and the other caster 120, 122 is steered. Although illustrated as located on the left-hand and right-hand sides, it should be understood that the position of the damping and steering assemblies 132, 134 could be reversed.

Figure 2:
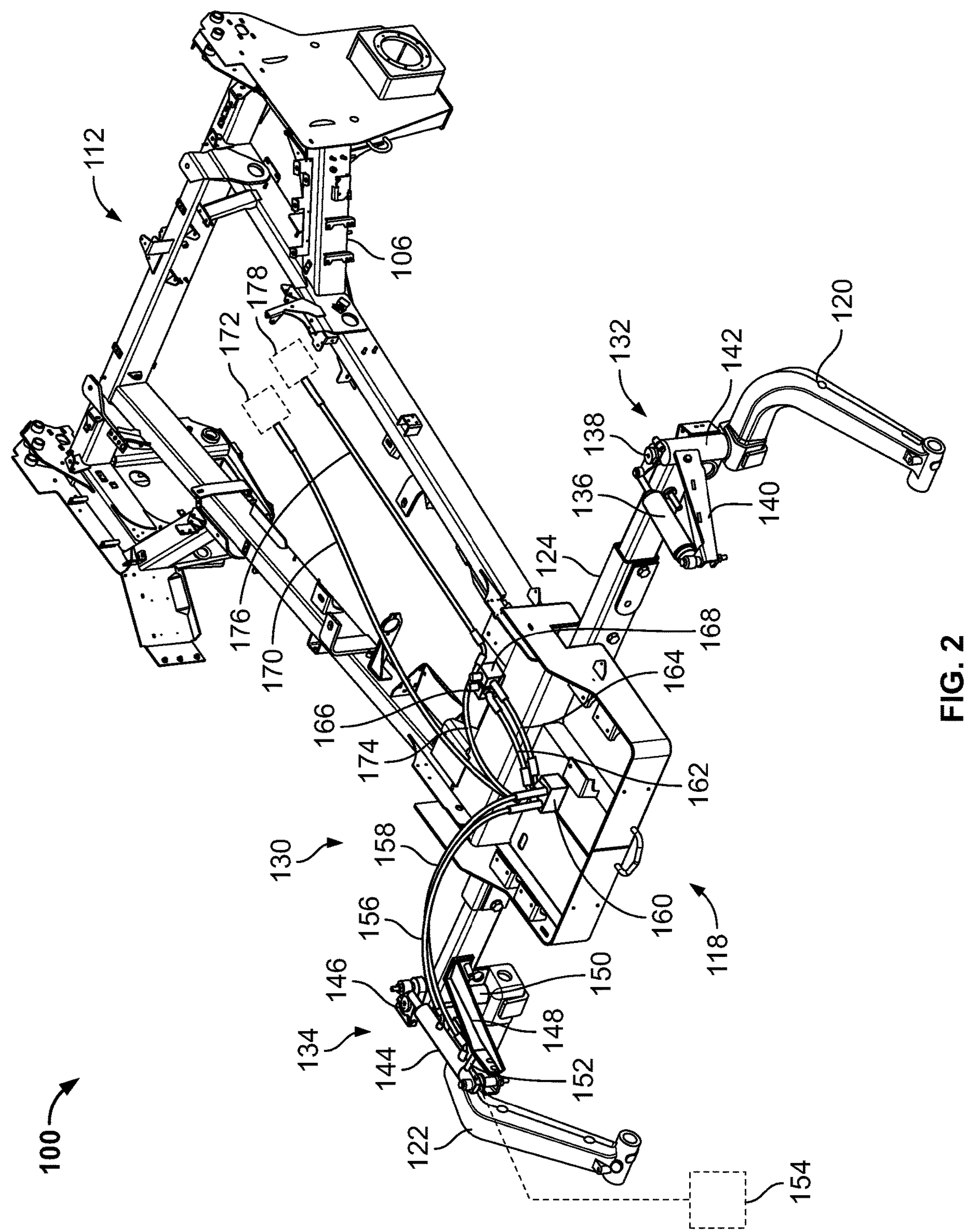
FIG. 2 is a perspective view of a windrower with an exemplary steering control system of the present disclosure.
Figure 3:
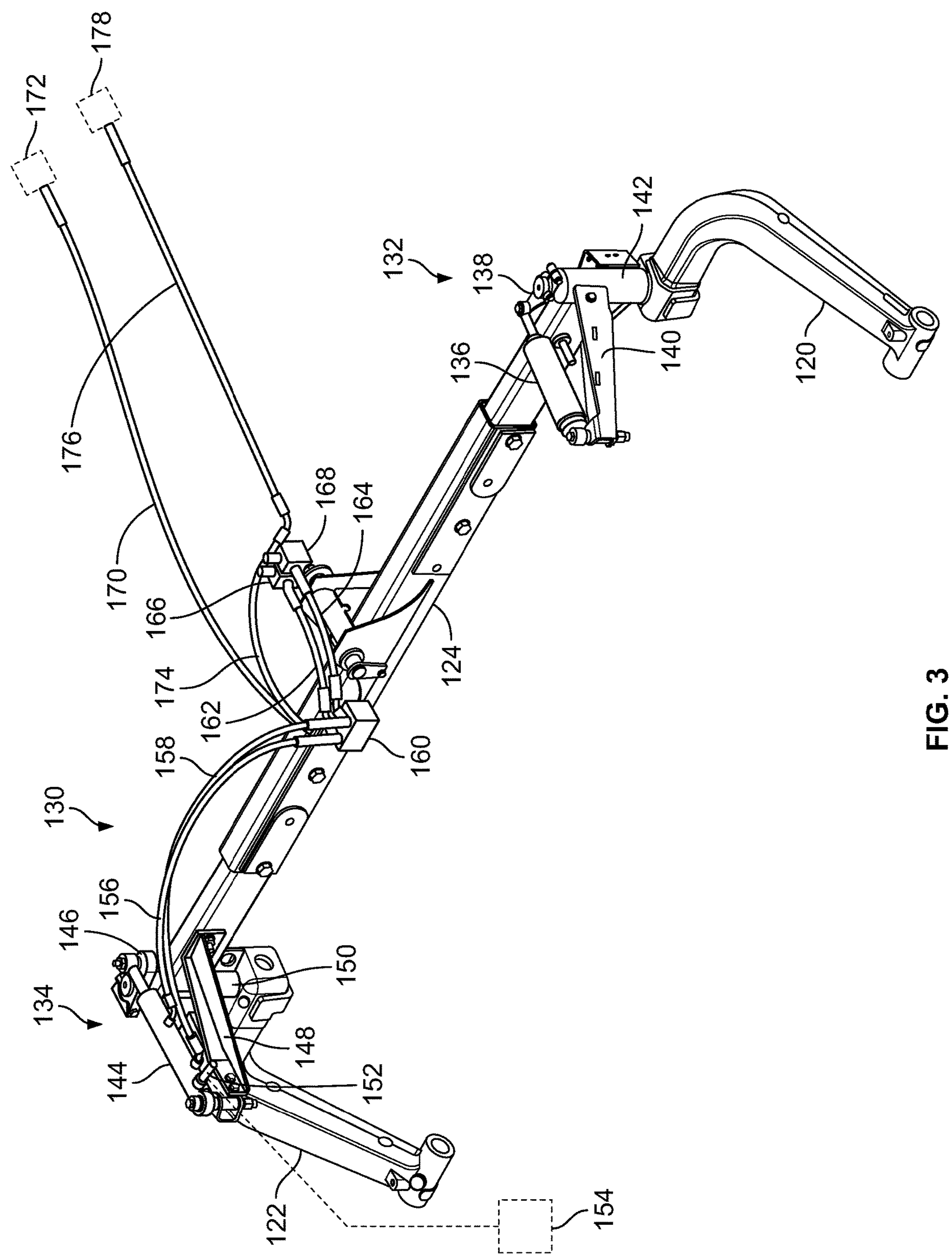
FIG. 3 is a perspective view of a rear axle of a windrower with an exemplary steering control system of the present disclosure.
Figure 4:
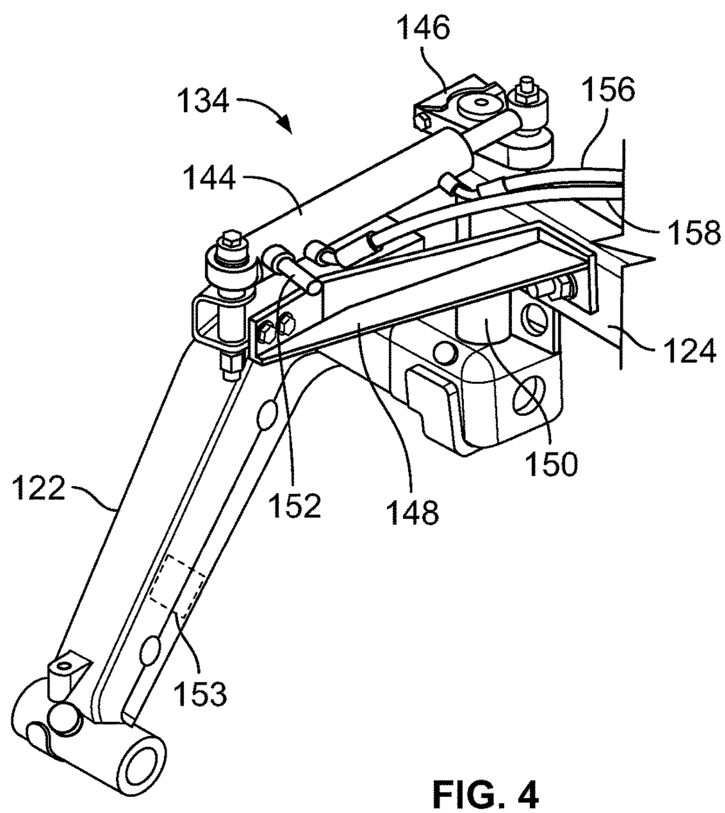
FIG. 4 is a detailed view of a steering assembly of an exemplary steering control system of the present disclosure.
Figure 5:
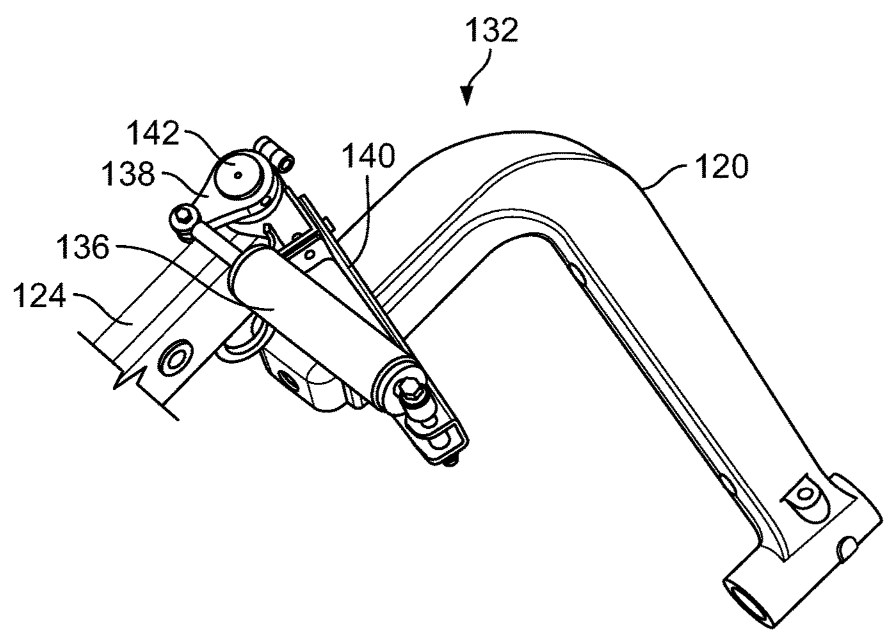
FIG. 5 is a detailed view of a damping assembly of an exemplary steering control system of the present disclosure.

FIGS. 2 and 3 show perspective views of the windrower 100 and rear axle 124 of the windrower with the steering control system 130. FIGS. 4 and 5 show detailed views of the steering and damping assemblies 134, 132 of the steering control system 130. The damping assembly 132 includes a passive damper 136 (e.g., a shock absorber, a shimmy damper, or the like) pivotably coupled at one end to an arm 138 and pivotably coupled at the opposing end to a flange 140. The damper 136 passively damps the oscillation of the caster 120 without providing any steering action of the caster 120. The opposing end of the arm 138 is rigidly coupled to the top of an upright shaft 142 and is rotatable about a pivot axis defined by the upright shaft 142 (e.g., the pivot axis of the caster 120) with the caster 120. The shaft 142 and the arm 138 thereby rotate together with the caster 120. The opposing end of the flange 140 is fixedly coupled to the axle 124 and does not pivot. The upright shaft 142 pivots within the axle 124 with the flange 140 remaining in a fixed, rigidly mounted position on the axle 124. The rigid position of the flange 140 allows for the extension and retraction of the damper 136 as the assembly of the arm 138, the shaft 142, and the caster 120 rotates about the axis of the shaft 142. The extension and retraction of the damper 136, in turn, provides damping to the caster 120.

The steering assembly 134 includes a steering cylinder 144 (e.g., a hydraulic cylinder) pivotably coupled at one end to an arm 146 and pivotably coupled at the opposing end to a flange 148. The cylinder 144 can be hydraulically actuated to extend or retract, thereby providing steering to the left-hand side caster 122. The opposing end of the arm 146 is rigidly coupled to the top of an upright shaft 150 and is rotatable about a pivot axis defined by the upright shaft 150 (e.g., the pivot axis of the caster 122) with the caster 122. The shaft 150 and the arm 146 thereby rotate together with the caster 122. The opposing end of the flange 148 is fixedly coupled to the axle 124 and does not rotate with the shaft 150. The arm 146 is rigidly coupled to the shaft 150, with the shaft 150 rigidly connected to the caster 122. The arm 146, the shaft 150, and the caster 122 thereby rotate within the upright of axle 124 about the axis of the shaft 150. The steering assembly 134 includes one or more sensors 152 capable of detecting the position or amount of extension/retraction of the cylinder 144, and transmits data corresponding to the position of the cylinder 144 to a controller module 154 as feedback regarding steering of the caster 122.

Hydraulic lines 156, 158 (e.g., pressure and vent lines) connect the cylinder 144 to a steering proportional valve 160. Hydraulic lines 162, 164 connect the steering proportional valve 160 to respective blocking valves 166, 168. Hydraulic line 170 connects the steering proportional valve 160 to a steering pump 172. Hydraulic line 174 connects the steering proportional valve 160 to hydraulic line 176, which connects to tank 178, and hydraulic line 176 connects the blocking valves 166, 168 to a tank 178. The hydraulic lines can be actuated to extend or retract the cylinder 144. Extension or retraction of the cylinder 144 results in pivoting of the caster 122 at the upright shaft 150, allowing for steering of the caster 122. The steering control system 130 thereby provides for single wheel rear axle steering of the windrower 100.

Figure 6:
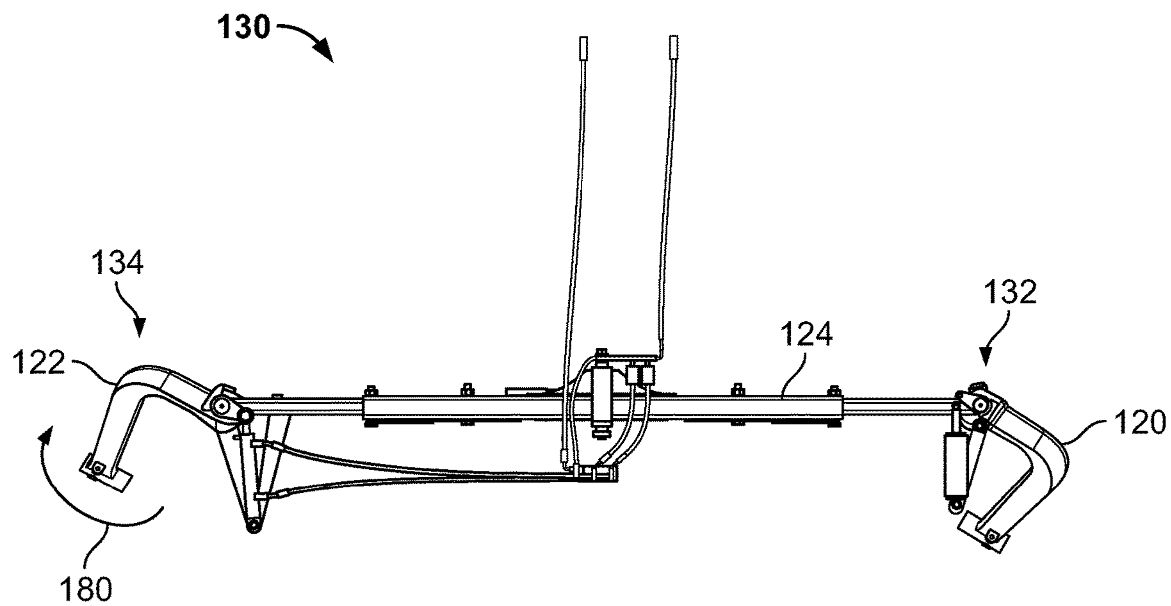
FIG. 6 is a top view of an exemplary steering control system of the present disclosure in a left turn operation.
Figure 7:
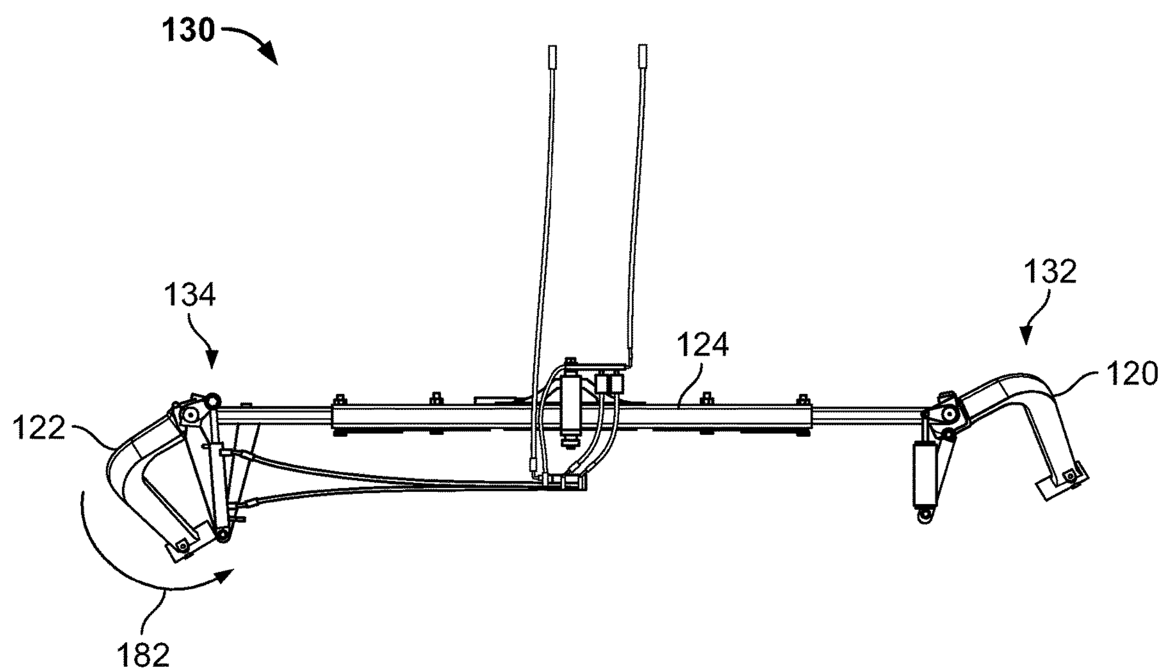
FIG. 7 is a top view of an exemplary steering control system of the present disclosure in a right turn operation.

FIG. 6 is a top view of the steering control system 130 in a left turn operation. Arrow 180 represents the direction of rotation of the caster 122 as actuated by the steering assembly 134. In the left turn operation, the steering assembly 134 is hydraulically controlled to retract the cylinder 144. FIG. 7 is a top view of the steering control system 130 in a right turn operation. Arrow 182 represents the direction of rotation of the caster 122 as actuated by the steering assembly 134. In the right turn operation, the steering assembly 134 is hydraulically controlled to extend the cylinder 144. In both left and right turn operations, steering of the windrower 100 is controlled by a combination of the front wheel dual-path steering and the left-hand side rear wheel steering assembly 134, while the right-hand side wheel passively casters to follow the control of steering with the damping assembly 132 providing passive damping during castering.

The exemplary steering control system 130 therefore provides for active steering control to one of the two rear wheels on the windrower 100, while the other rear wheel remains passively castering during the rear axle steering mode. Steering of one of the rear wheels, particularly during high-speed operation, provides additional stability to the front drive dual-path steering system rather than providing primary steering control. Thus, rather than providing the primary steering control of the windrower 100, steering of one of the rear wheels assists in stabilizing the system overall during high-speed and normal operation modes of the windrower 100.

As compared to conventional windrowers, the windrower 100 includes a steering cylinder 144 coupled to one of the casters 120, 122 that allows for directional control of the caster 120, 122, while the other caster 120, 122 maintains a traditional shimmy damper configuration without active steering control. The cylinder 144 uses the sensor 152 (e.g., internal cylinder position sensor, external position sensor, radial potentiometer, proximity sensor, or the like) to determine and transmit the radial position of the caster 122 to a controller. A control valve manifold can be used to extend and retract the steering cylinder 144. A steering pump 172 can be used to provide pressure/flow to the manifold, and valves and lines can provide a path for flow to return to tank 178 during field operation. An electronic steering wheel/device position sensor can be used to provide operator commanded steering wheel/device position to the controller, with such data used by the controller to calculate and execute the commanded steering position (e.g., extension or retraction of the cylinder 144) via a control algorithm.

The windrower 100 can remain in front drive dual-path steering during the different operation modes of the windrower 100, with the rear steering acting to supplement or assist in stabilizing operation of the windrower 100. In some embodiments, steering in the field can be provided only by the front drive dual-path steering, while the rear axle steering can function along with the dual-path steering during high-speed (e.g., road) operation mode. As noted above, the steering cylinder 144 connects to an arm 146 attached to the top of the upright shaft 150 (e.g., a caster vertical pivot shaft) at one end and the rear axle 124 (via the flange 148) at the opposing end.

The rod and barrel ports of the cylinder 144 can be plumbed to the proportional steering valve 160. The hydraulic lines to the steering cylinder 144 have blocking valves 166, 168 to tank 178 that are normally open, allowing free flow of fluid into and out of the cylinder 144 during field operation. Blocking valves 166, 168 are provided to block flow back to tank 178 in the rear axle steering mode. When all blocking valves 166, 168 are blocking flow back to tank 178, the movement of the steering cylinder 144 can be controlled by the steering valve 160.

In the field/free castering operation mode, all blocking valves 166, 168 are actuated into the open position, allowing free flow of fluid into and out of the steering cylinder 144. The steering cylinder 144 is extended and retracted based on the caster 122 position due to steering control from the front drive wheels. The steering valve 160 remains in the centered or closed position during this operation. The steering cylinder 144 acts as a caster damper during the field operation mode as the flow of fluid into and out of the cylinder 144 provides a viscous damping force on the steered caster 122. The non-steered caster 120 receives damping force from the passive shimmy damper 136 during field operation.

In the rear axle steering operation, the operator selects rear axle steering operation through the operator console in the cab or another command switch (e.g., at a user interface). The operator can be prompted to drive straight forward in order to orient the steered caster 122 and rear wheel 128 behind the rear axle 124 as this is this orientation of the caster 122 during rear axle steering operation. In some embodiments, a proximity sensor 153 can be incorporated into the steering assembly 134 to detect and transmit data to the controller regarding the position of the caster 122 and/or wheel 128 relative to the rear axle 124 (see FIG. 4). In some embodiments, a similar proximity sensor can be disposed on the caster 120 to detect and transmit data to the controller regarding the position of the caster 122 and/or wheel 126 relative to the rear axle 124. For example, a magnetic sensor on the caster 122 and a fixed target on the rear axle 124 can be used to sense when the caster 122 is in a position behind the rear axle 124 prior to initiating the rear axle steering operation.

Figure 8:
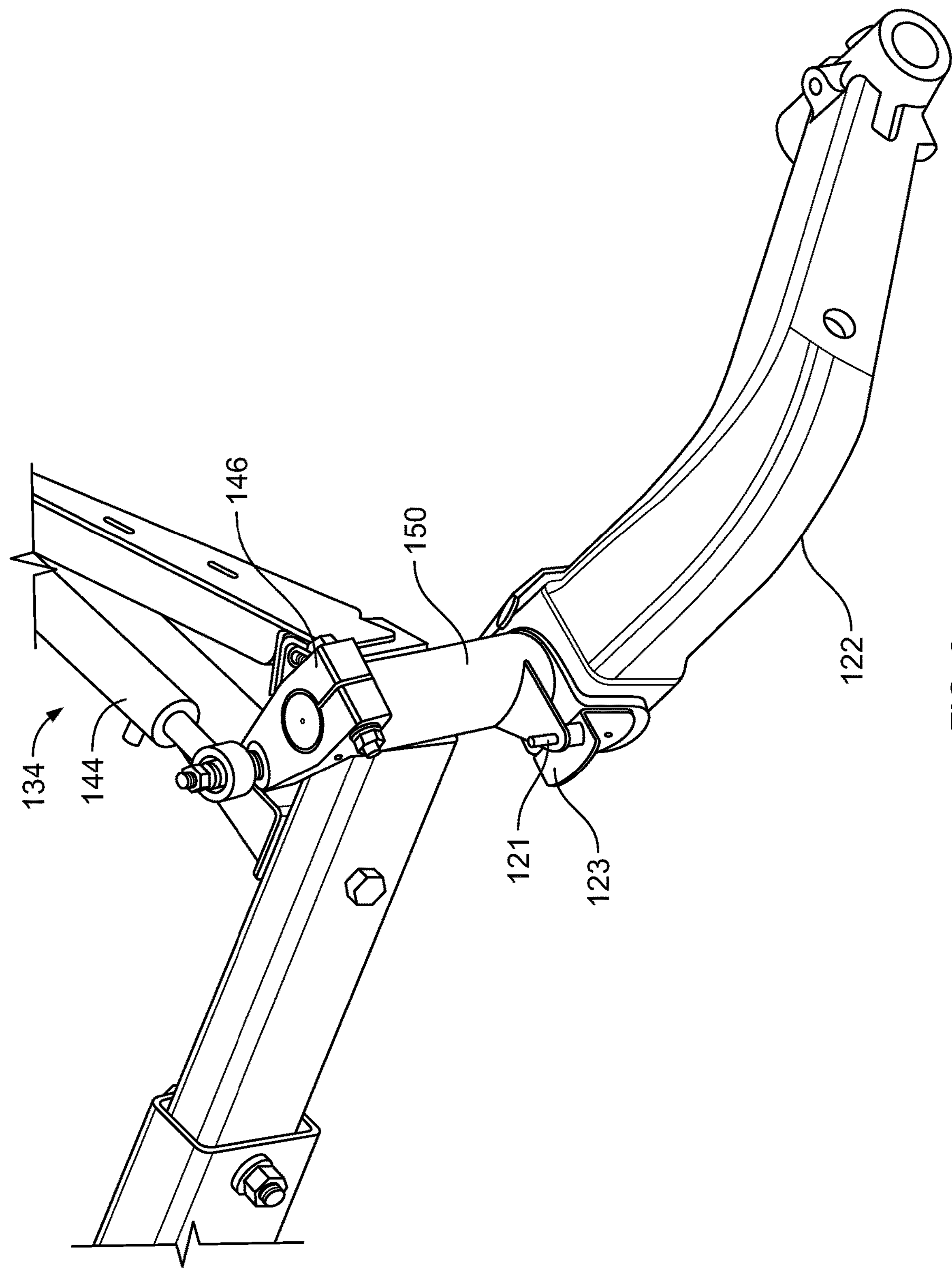
FIG. 8 is a detailed view of a steering assembly of an exemplary steering control system of the present disclosure.

FIG. 8 is a detailed view of the steering assembly 134. As noted above, in some embodiments, a proximity sensor 121 can be rigidly coupled to the axle 124 via the casing for the shaft 150. In some embodiments, the sensor 121 can be disposed within an opening of a flange extending from the casing for the shaft 150. A target 123 can be rigidly coupled to the caster 122. The target 123 can rotate with rotation of the caster 122 with the sensor 121 detecting the target 123 only when the caster 122 has rotated behind the axle 124. Upon detection of the target 123 with the sensor 121, the rear axle steering operation can be initiated.

When the controller receives data from the sensor 152 that the steering cylinder 144 is in the steering straight position, the blocking valves 166, 168 can be actuated to shift and block all flow into and out of the steering cylinder 144. Blocking flow into and out of the steering cylinder 144 creates a closed circuit where the retraction and extension of the steering cylinder 144 (and thereby the steering direction of the steered caster 122) is controlled by the steering valve 160. To steer the rear wheel 128, the operator can input a steering command by turning the steering wheel/device to a desired position. A steering sensor receives data corresponding with the steering command (e.g., the amount of rotation of the steering wheel, the input desired rotation of the windrower 100, or the like). In some embodiments, the steering sensor can be electronically coupled to the steering wheel/device. The controller uses the position data received from the steering sensor to command a steering angle of the rear axle steering cylinder 144 with position sensing. Thus, the controller can extend or retract the steering cylinder 144 as needed to achieve the desired input at the steering wheel/device, with the sensor 152 detecting and transmitting the position of the steering cylinder 144 (and thereby the caster 122) to the controller.

Figure 9:
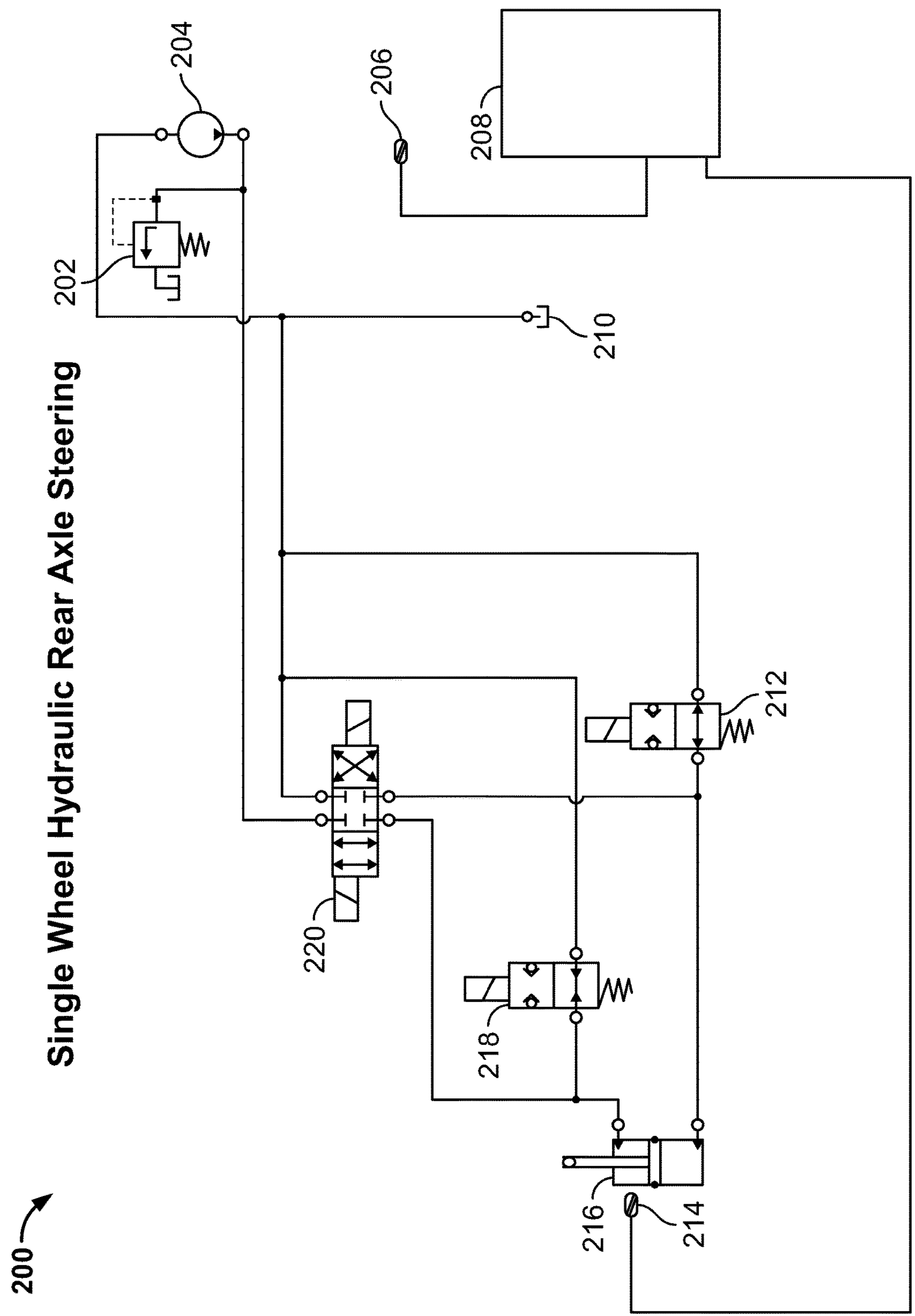
FIG. 9 is a static image of a hydraulic circuit of an exemplary steering control system of the present disclosure.

FIG. 9 is a static image of a hydraulic circuit 200 of the steering control system 130. The hydraulic circuit 200 includes a relief valve 202, a steering pump 204, a steering wheel or device position sensor 206, and a controller 208. The hydraulic circuit 200 includes a tank 210, a return to tank blocking valve 212, a return to tank blocking valve 218, and a steering proportional directional valve 220. The hydraulic circuit 200 includes a steering cylinder 216 and a cylinder position sensor 214.

Figure 10:
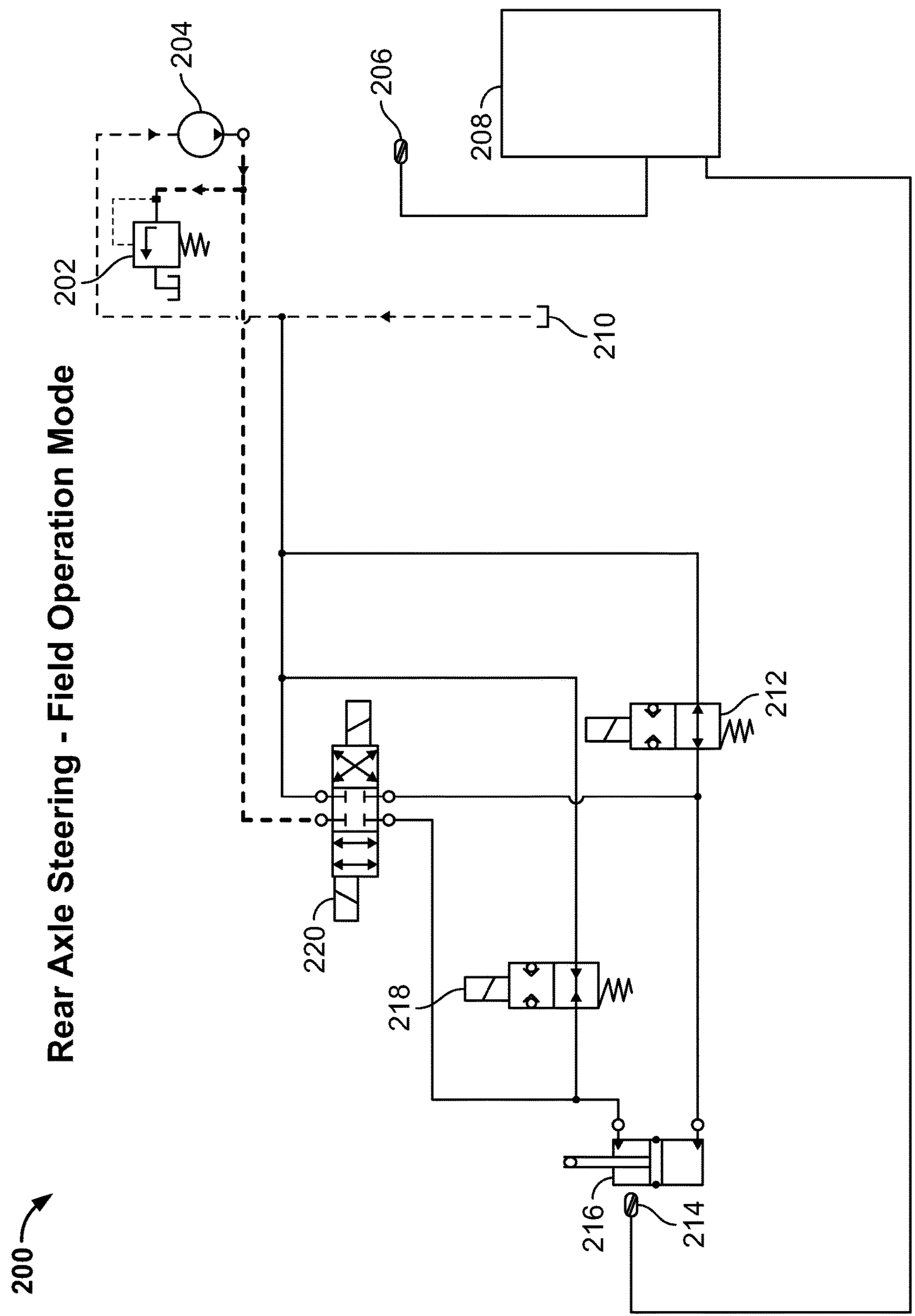
FIG. 10 is the hydraulic circuit of FIG. 9 in a field operation mode.

FIG. 10 is the hydraulic circuit 200 in an in-field operation mode. The blocking valves 212, 218 are opened, allowing free flow of hydraulic fluid into and out of the steering cylinder 216 and back to tank 210. Steering of the windrower 100 is controlled by the front drive wheel dual-path steering system only (e.g., without steering from the cylinder 216).

Figure 11:
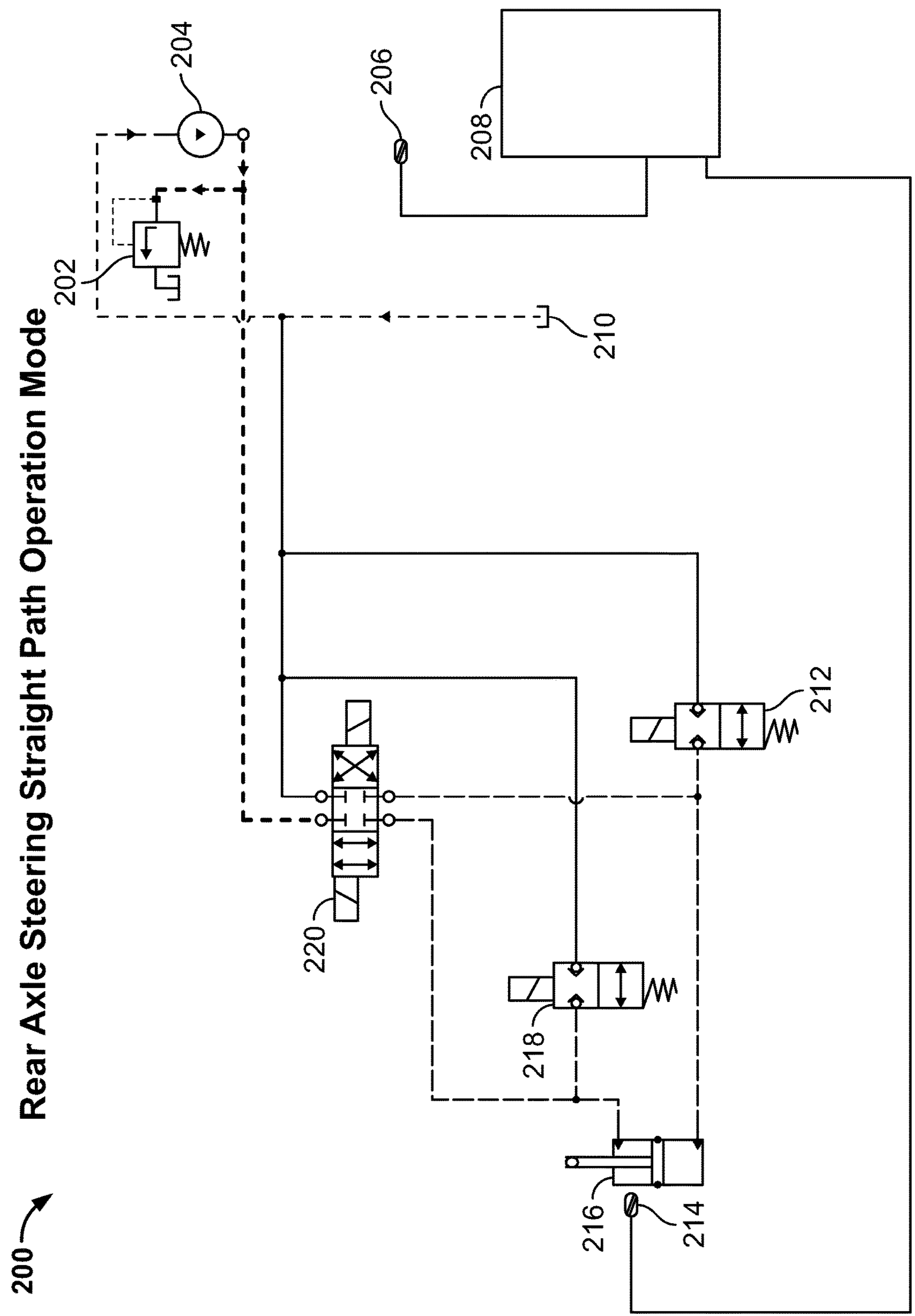
FIG. 11 is the hydraulic circuit of FIG. 9 in a straight path operation mode.

FIG. 11 is the hydraulic circuit 200 in a straight path operation mode. The steering proportional directional valve 220 is centered with the steering cylinder 216 centered (e.g., partially extended). Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 12:
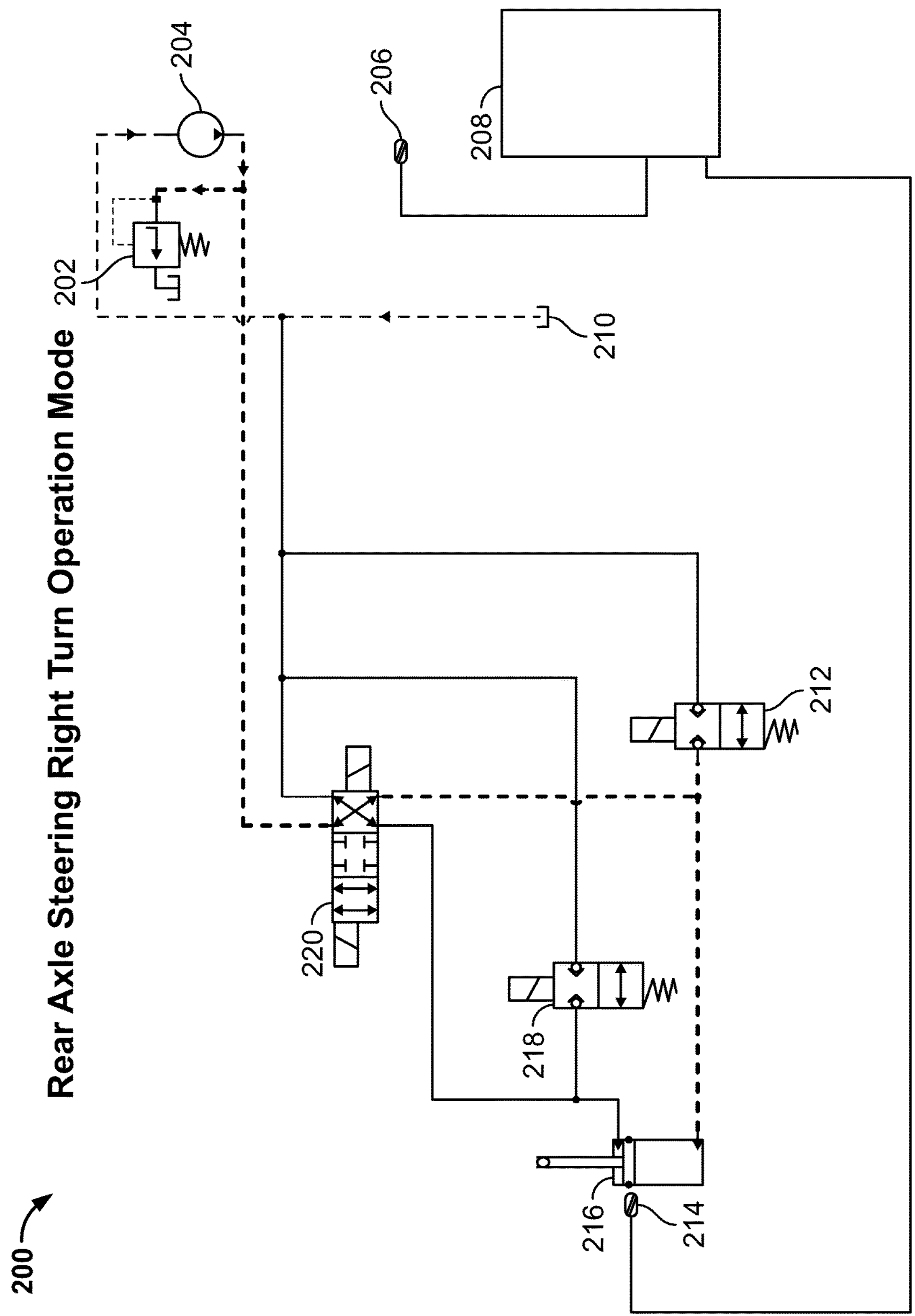
FIG. 12 is the hydraulic circuit of FIG. 9 in a right turn operation mode.

FIG. 12 is the hydraulic circuit 200 in a right turn operation mode. The steering proportional directional valve 220 is shifted to extend the steering cylinder 216, resulting in the windrower 100 turning right. Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 13:
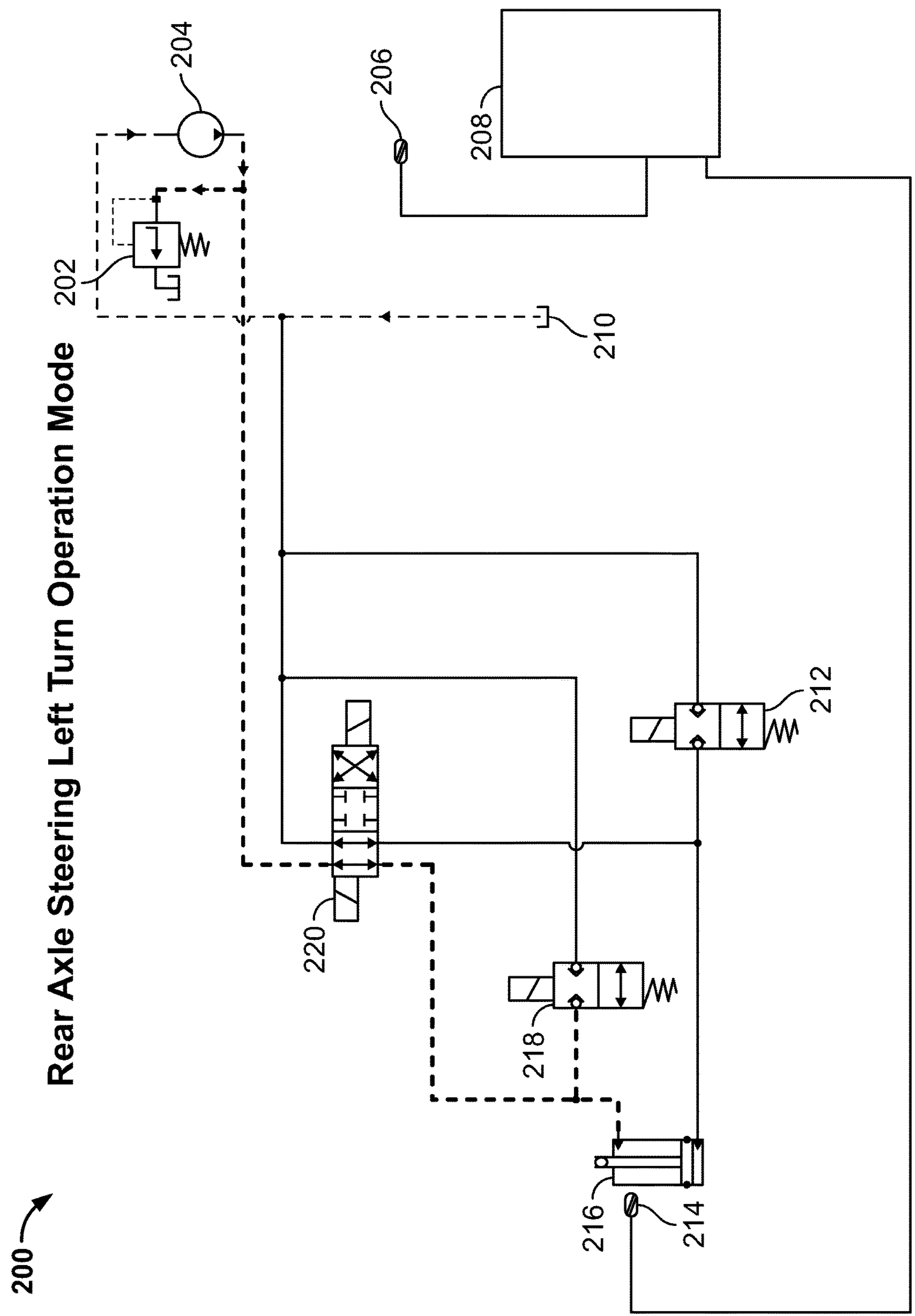
FIG. 13 is the hydraulic circuit of FIG. 9 in a left turn operation mode.

FIG. 13 is the hydraulic circuit 200 in a left turn operation mode. The steering proportional directional valve 220 is shifted to retract the steering cylinder 216, resulting in the windrower 100 turning left. Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 14:
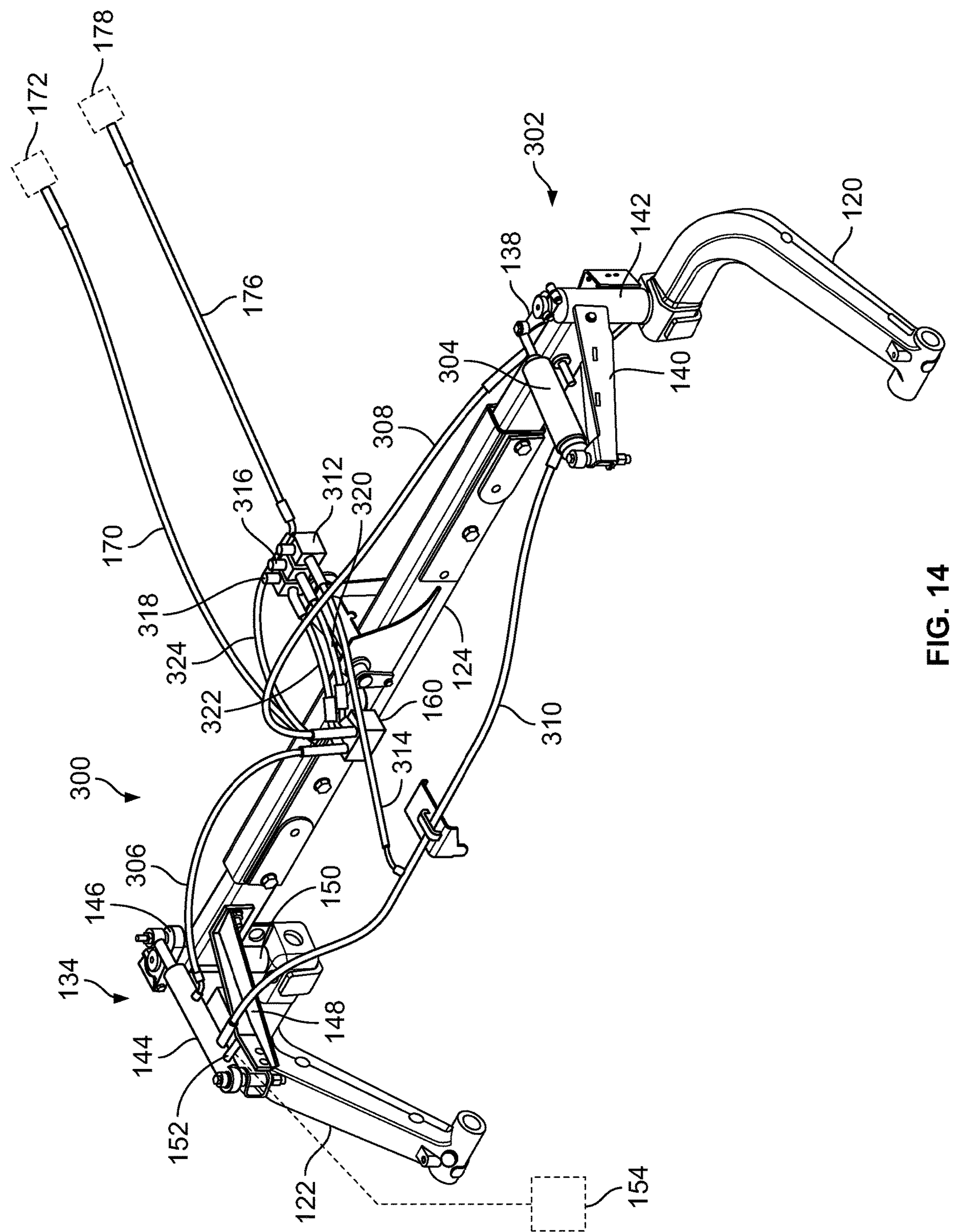
FIG. 14 is a perspective view of an exemplary steering control system of the present disclosure.
Figure 15:
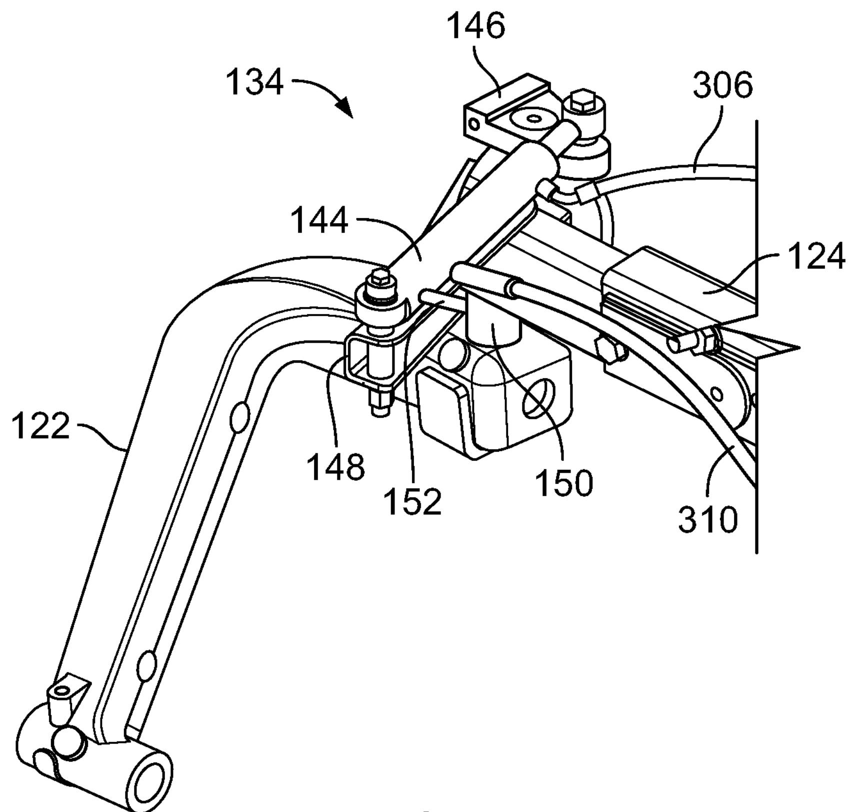
FIG. 15 is a detailed view of an exemplary steering control system of the present disclosure.
Figure 16:
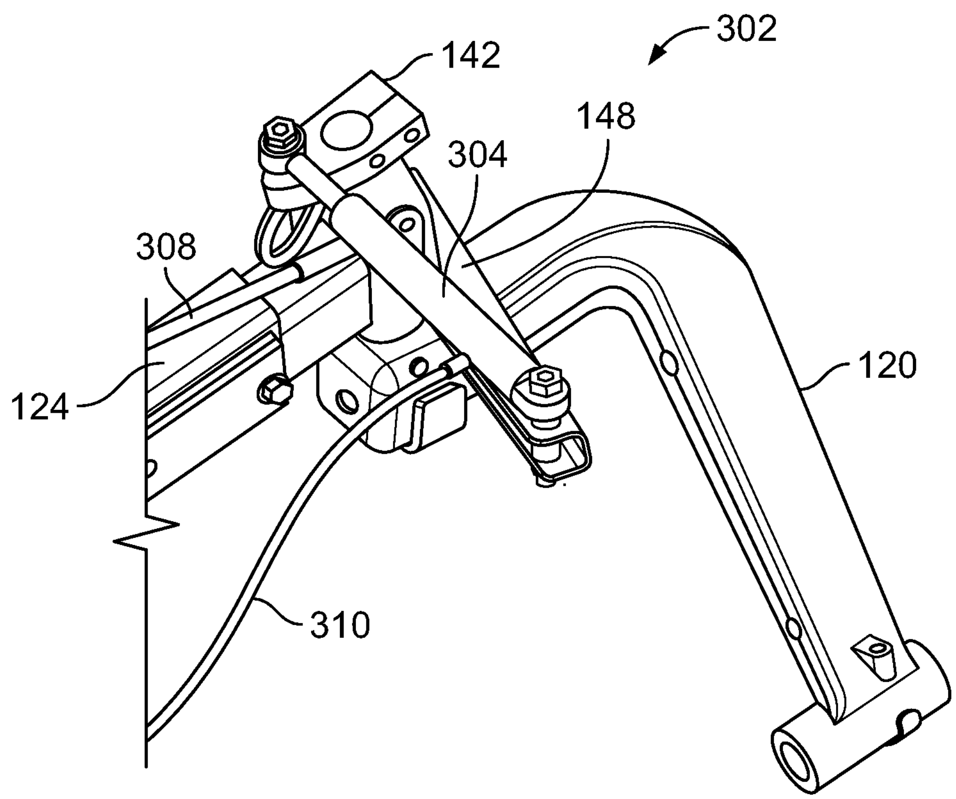
FIG. 16 is a detailed view of an exemplary steering control system of the present disclosure.

FIGS. 14-16 are perspective and detailed views of an exemplary steering control system 300 of the present disclosure. The steering control system 300 can be substantially similar in structure and function to the steering control system 130 except for the distinctions noted herein. Therefore, like reference numbers refer to like structures. Particularly, rather than having a steering assembly associated with only one caster, the steering control system 300 includes a steering assembly associated with each of the casters with only one of the steering assemblies being actuated to steer the rear wheels and the other steering assembly moving in an equal and opposite direction from the first steering assembly.

The steering assembly 134 on one of the casters 122 includes the sensor 152 in communication with the controller 154 such that the detected position of the caster 122 (based on the extension/retraction of the cylinder 144) can be used to control the cylinder 144 to achieve the desired steering of the windrower 100. Rather than a passive damper, the steering control system 300 includes a second steering assembly 302 at the other caster 120. The steering assembly 302 includes a steering cylinder 304 capable of being hydraulically actuated to extend or retract, thereby adjusting the rotational position of the caster 120.

Rather than having a sensor associated with the steering cylinder 304, the steering assembly 302 can be hydraulically coupled to the steering assembly 134 such that actuation of the steering cylinder 144 to extend or retract automatically actuates the steering cylinder 304 to extend or retract in an equal and opposite direction. The extension or retraction of the steering cylinder 304 is therefore directly tied to actuation of the steering cylinder 144 and is dependent on the single sensor 152 of the steering control system 300. Both steering cylinders 144, 304 are actuated to steer the casters 120, 122, with the position of only one of the casters 120, 122 being measured by the sensor 152 (e.g., a master/slave arrangement with the steering cylinder 144 acting as the master component and the steering cylinder 304 acting as the slave component).

Each of the steering cylinders 144, 304 is coupled to the steering proportional valve 160 via hydraulic lines 306, 308. The steering cylinders 144, 304 are coupled to each other by a hydraulic line 310, which is further coupled to a blocking valve 312 by a hydraulic line 314. The steering proportional valve 160 is coupled to blocking valves 316, 318 by hydraulic lines 320, 322. Each of the blocking valves 312, 316, 318 is coupled to tank 178 by a hydraulic line 176, and the steering proportional valve 160 is coupled to tank 178 by a hydraulic line 324. The steering proportional valve 160 is further coupled to the steering pump 172 by hydraulic line 170.

Figure 17:
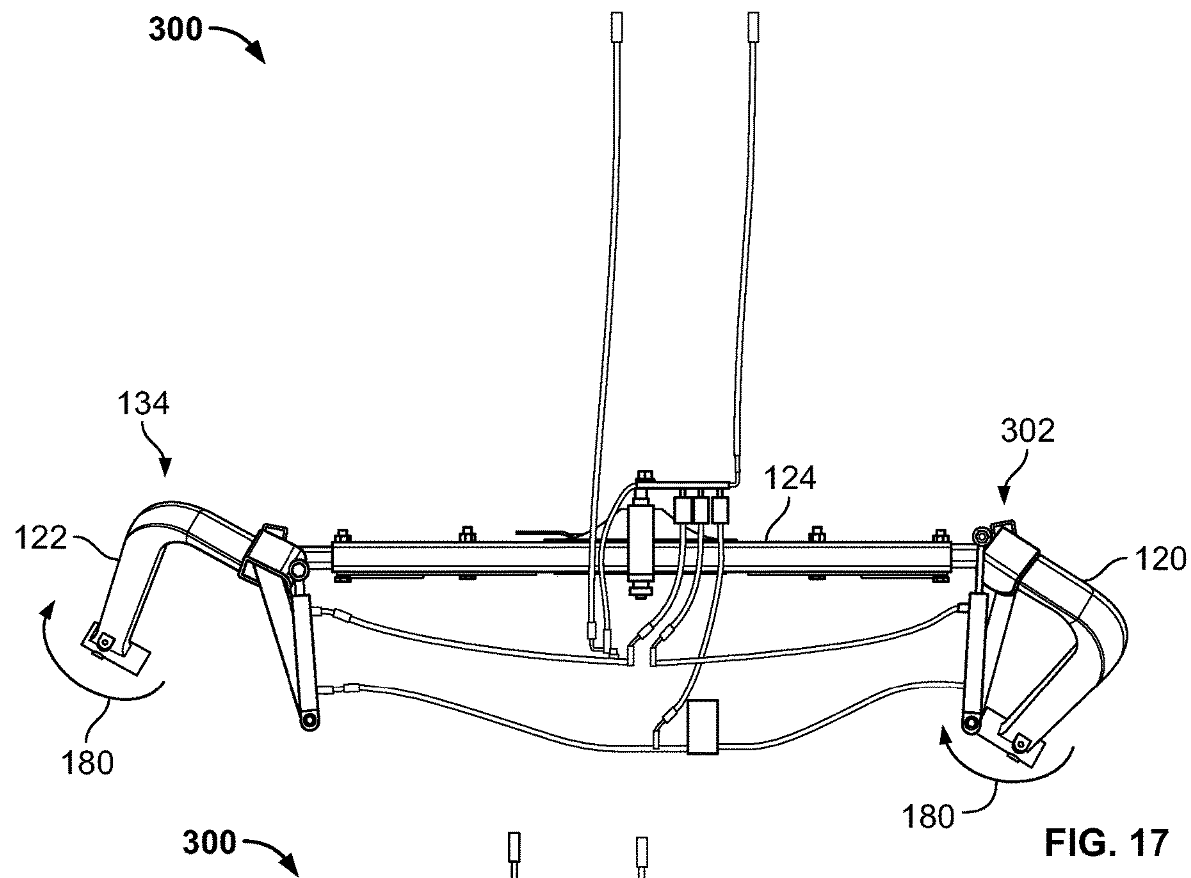
FIG. 17 is a top view of an exemplary steering control system of the present disclosure in a left turn operation.
Figure 18:
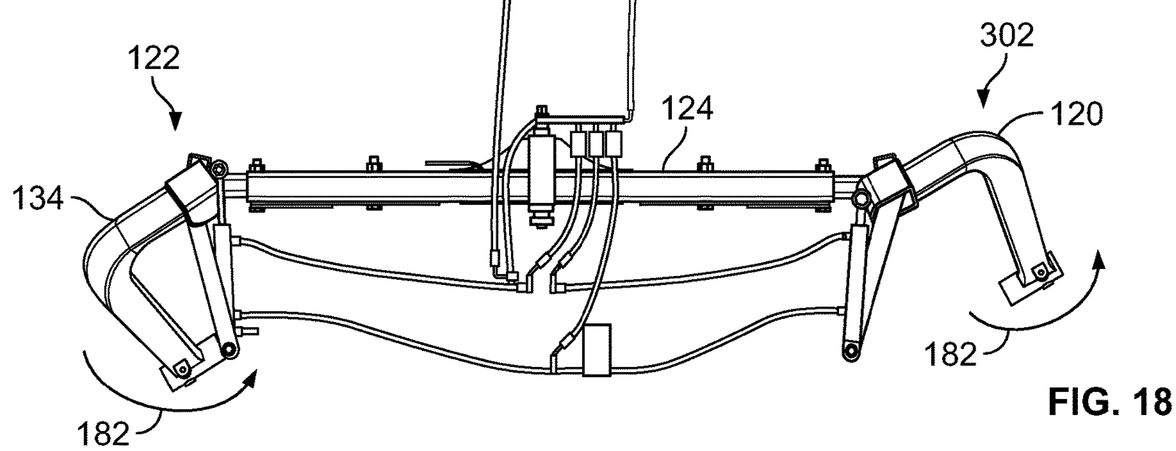
FIG. 18 is a top view of an exemplary steering control system of the present disclosure in a right turn operation.

FIG. 17 is a top view of the steering control system 300 in a left turn operation. Arrow 180 represents the direction of rotation of the caster 122 as actuated by the steering assembly 134, and the direction of rotation of the caster 120 as actuated by the steering assembly 302 tied to the steering assembly 134. In the left turn operation, the steering assembly 134 is hydraulically controlled to retract the cylinder 144, and the cylinder 304 of the steering assembly 302 is hydraulically controlled to extend in an equal and opposite direction to the cylinder 144 due to fluid connection of the barrel ends of the cylinders 144, 304. FIG. 18 is a top view of the steering control system 300 in a right turn operation.

Arrow 182 represents the direction of rotation of the caster 122 as actuated by the steering assembly 134, and the direction of rotation of the caster 120 as actuated by the steering assembly 302 tied to the steering assembly 134. In the right turn operation, the steering assembly 134 is hydraulically controlled to extend the cylinder 144, and the cylinder 304 of the steering assembly is hydraulically controlled to extend in an equal and opposite direction to the cylinder 144. In both left and right turn operations, steering of the windrower 100 is controlled by a combination of the front wheel dual-path steering and the rear wheel steering assemblies 134, 302, with the right-hand side steering assembly 302 controlled based on the left-hand side position sensor 152.

The steering control system 300 therefore provides for rear axle steering of the windrower 100 with cylinders 144, 304 hydraulically coupled to move in equal and opposite directions during operation with the position of only one cylinder 144 measured to control the steering action of the rear wheels. The steering control system 300 is capable of providing stability to the windrower 100 during high-speed operation with directional control of the rear wheels without necessitating multiple position sensing cylinders 144, 304. As noted above, the windrower 100 includes two steering cylinders 144, 304 for each respective caster 120, 122. Only one of the cylinders 144 includes a means for the controller 154 to determine the radial position of the caster 122 (e.g., an internal cylinder position sensor, an external position sensor, a radial potentiometer, or the like).

A control valve manifold can be used to extend and retract the steering cylinders 144, 304. A steering pump 172 can provide pressure or flow to the manifold, and valves and lines can provide a path for flow to return to tank 178. An electronic steering wheel/device position sensor can be used to provide an operator commanded steering wheel/device position to the controller 154 which, in turn, can be used to calculate and execute the commanded steering position via a control algorithm (e.g., the amount of extension or retraction of the cylinder 144, 304).

The windrower 100 can retain the front drive dual-path steering for all operations, with the steering control system 300 assisting in stabilizing operation of the windrower 100 in at least the high-speed operation mode. For example, steering in the field can be provided only by the front drive dual-path steering, while the rear axle steering functions along with the dual-path steering during high-speed road mode operation. The cylinders 144, 304 connect to respective arms 146, 138 attached to the top of the caster vertical pivot shaft at one end and the rear axle 124 of the windrower 100 at the other end (via flanges 148, 140).

The barrel ports of the cylinders 144, 304 can be plumbed together, while the rod ports can be plumbed to the proportional steering valve 160. The hydraulic lines to the steering cylinders 144, 304 include blocking valves 312, 316, 318 to tank 178 that are normally open, allowing free flow of fluid into and out of the cylinders 144, 304 during field operation. The blocking valves 312, 316, 318 are provided to block flow back to tank 178 in the rear axle steering mode. When all blocking valves 312, 316, 318 are blocking flow back to tank 178, movement of the steering cylinders 144, 304 can be controlled by the steering valve 160.

Such arrangement results in retraction of a first cylinder (e.g., cylinder 144) causing fluid to be displaced from the barrel end of the first cylinder and into the barrel end of the second cylinder (e.g., cylinder 304). The fluid displacement actuates the second cylinder to extend an equal amount that the first cylinder retracts when the proportional valve 160 shifts to retract the first cylinder. The setup allows a position sensor 152 to be provided on only one steering cylinder for providing steering cylinder position feedback to the controller 154.

In the field/free castering operation mode, all blocking valves 312, 316, 318 are opened, allowing free flow of fluid to and from the steering cylinders 144, 304. The steering cylinders 144, 304 extend and retract based on the caster 120, 122 position due to the steering control from the front drive wheels. The steering valve 160 remains in the centered or closed position during such operation. The steering cylinders 144, 304 act as caster dampers during field operation as the flow of fluid into and out of the cylinders 144, 304 provides a viscous damping force.

In the rear axle steering operation mode, the operator can select the rear axle steering operation through an operator console, user interface or other command switch. The operator can be prompted to drive the windrower 100 straight forward in order to orient the casters/rear wheels behind the rear axle 124 as this is the orientation of the casters 120, 122 during the rear axle steering operation. In some embodiments, one or more proximity sensors can be used to detect the position of the casters 120, 122 relative to the rear axle 124. When the controller 154 receives data indicating that the sensing cylinder 144 is in the steering straight position, the blocking valves 312, 316, 318 can be shifted to block all flow into and out of the steering cylinders 144, 304, creating a closed circuit in which the retraction of a steering cylinder on one side causes an equal and opposite extension of the steering cylinder on the other side of the windrower 100.

To steer the rear wheels, the operator can make a steering input command by turning the steering wheel or device to a desired position. Such position can be sensed by a steering sensor coupled to the steering wheel or device. The controller 154 can use the detected position of the steering wheel or device to command a steering angle of the rear axle steering cylinder 144 with position sensing. For example, the controller 154 can actuate the steering cylinder 144 to extend or retract to achieve the desired steering with the position sensor 152 providing feedback to the controller 154 regarding actuation of the cylinder 144.

Because the cylinder 144 includes the position sensor 152 and the cylinder 304 does not, the controller 154 uses the position data from the position sensor 152 for adjustments of both cylinders 144, 304. For example, the cylinder 144 can be actuated to extend by shifting the steering valve 160 to retract the cylinder 304. As a further example, if the input command necessitates that the cylinder 144 be retracted, the steering valve 160 can shift to retract the cylinder 144 which, in turn, extends the cylinder 304 due to the barrel ports of the cylinders 144, 304 being plumbed together. In some embodiments, the steering valve 160 can hydraulically connect only to the rod ends of the steering cylinders 144, 304 with no direct fluid communication with the barrel ends of the steering cylinders 144, 304.

As such, the steering control system 300 allows for one position sensing cylinder 144 to determine the radial position of the caster 122, while the second caster 120 and cylinder 304 do not necessitate position sensing. The steering valve 160 acts directly on only the rod end of the cylinder 144, reducing the flow requirement for a comparable system in which valves act on both the rod and barrel ends (e.g., due to the reduced volume of the rod end compared to the barrel end). It should be understood that the position sensing can be on either the cylinder 144 or cylinder 304.

In some embodiments, the steering valve can act on the barrel end of the cylinders, the rod end port of the steering cylinders can be plumbed together rather than the barrel ends or the like. In some embodiments, a proximity sensor can be used on the non-position sensing side to confirm that the non-sensing side is centered when entering the rear axle steering operation. For example, a magnetic sensor and a fixed target that is sensed only when the caster is in the proper rear axle steering straight orientation can be used. Alternatively, an active calibration can take place to enter the rear axle steering mode by prompting the operator to drive straight forward for a predetermined distance after the position sensing caster is in a straight orientation position. At such point, all blocking valves can block flow from the steering cylinders to tank and the system 300 can be a closed circuit with rear axle steering active.

Figure 19:
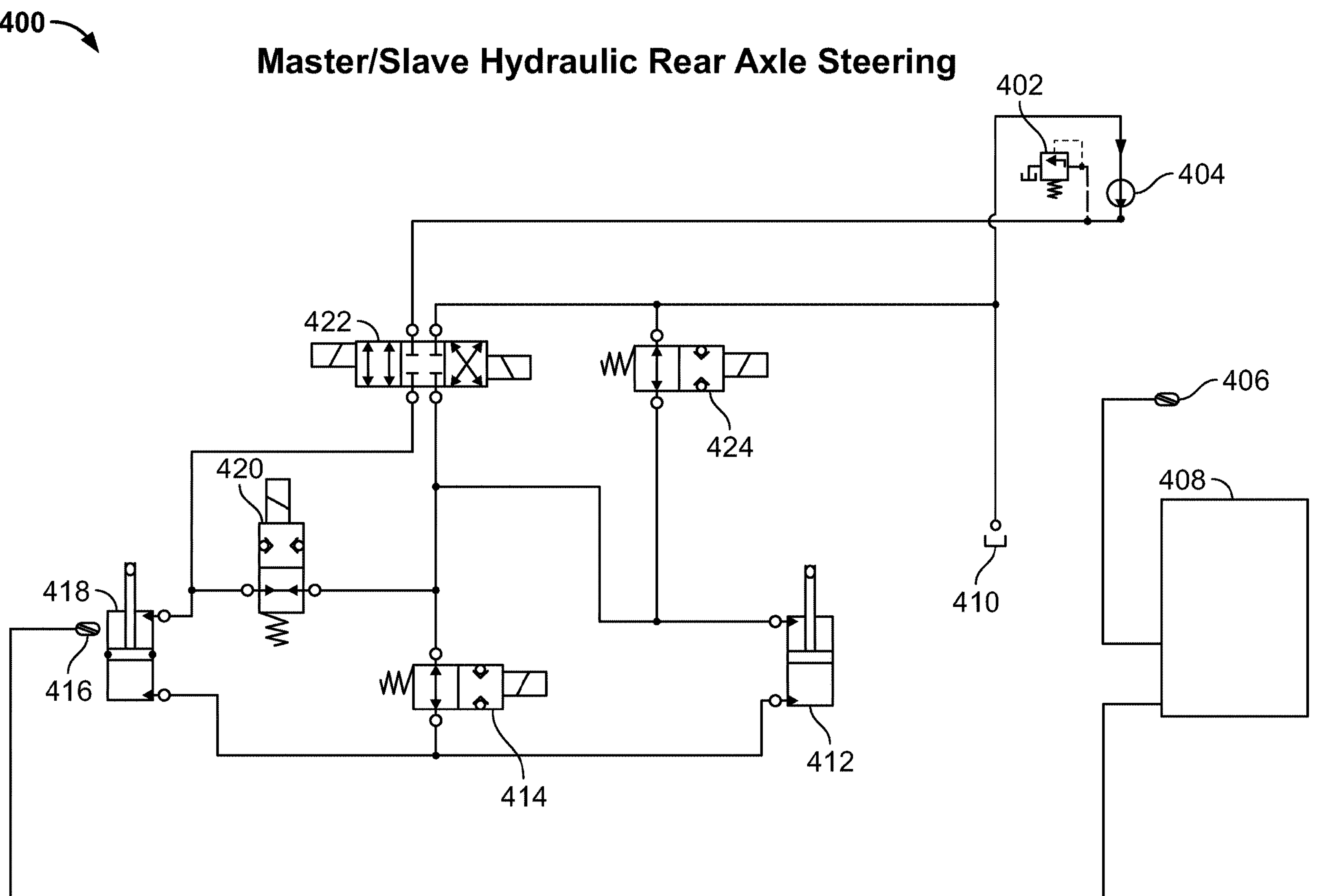
FIG. 19 is a static image of a hydraulic circuit of an exemplary steering control system of the present disclosure.

FIG. 19 is a static image of a hydraulic circuit 400 of the steering control system 300. The hydraulic circuit 400 includes a relief valve 402, a steering pump 404, a steering wheel or device position sensor 406, and a controller 408. The hydraulic circuit 400 includes a tank 410, return to tank blocking valves 414, 420, 424, and a steering proportional directional valve 422. The hydraulic circuit 400 includes steering cylinders 412, 418 and a cylinder position sensor 416 associated with only the steering cylinder 418.

Figure 20:
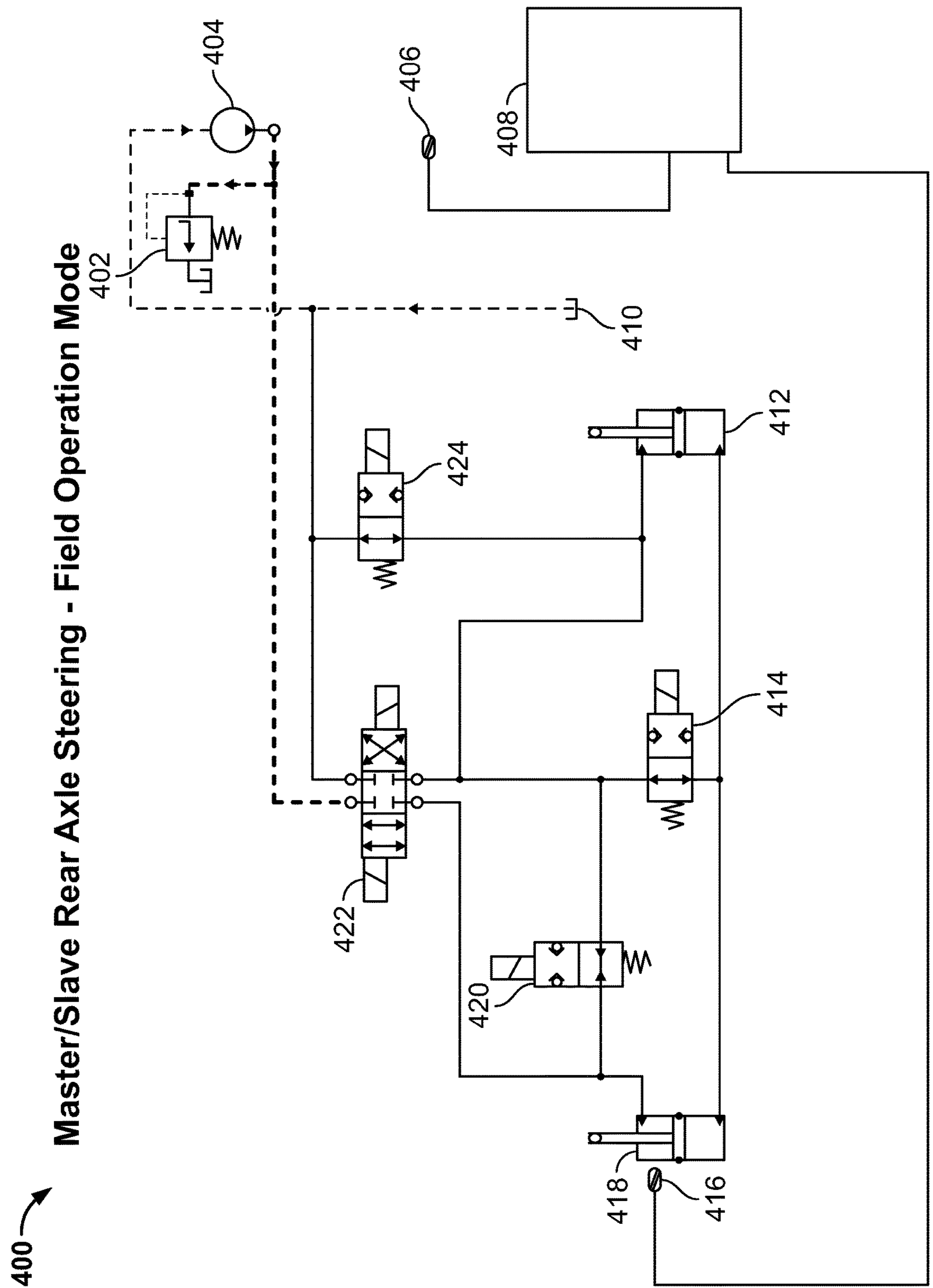
FIG. 20 is the hydraulic circuit of FIG. 19 in a field operation mode.

FIG. 20 is the hydraulic circuit 400 in an in-field operation mode. The blocking valves 414, 420, 424 are opened, allowing free flow of hydraulic fluid into and out of the steering cylinders 412, 418 and back to tank 410. Steering of the windrower 100 is controlled by the front drive wheel dual-path steering system only (e.g., without steering from the cylinders 412, 418).

Figure 21:
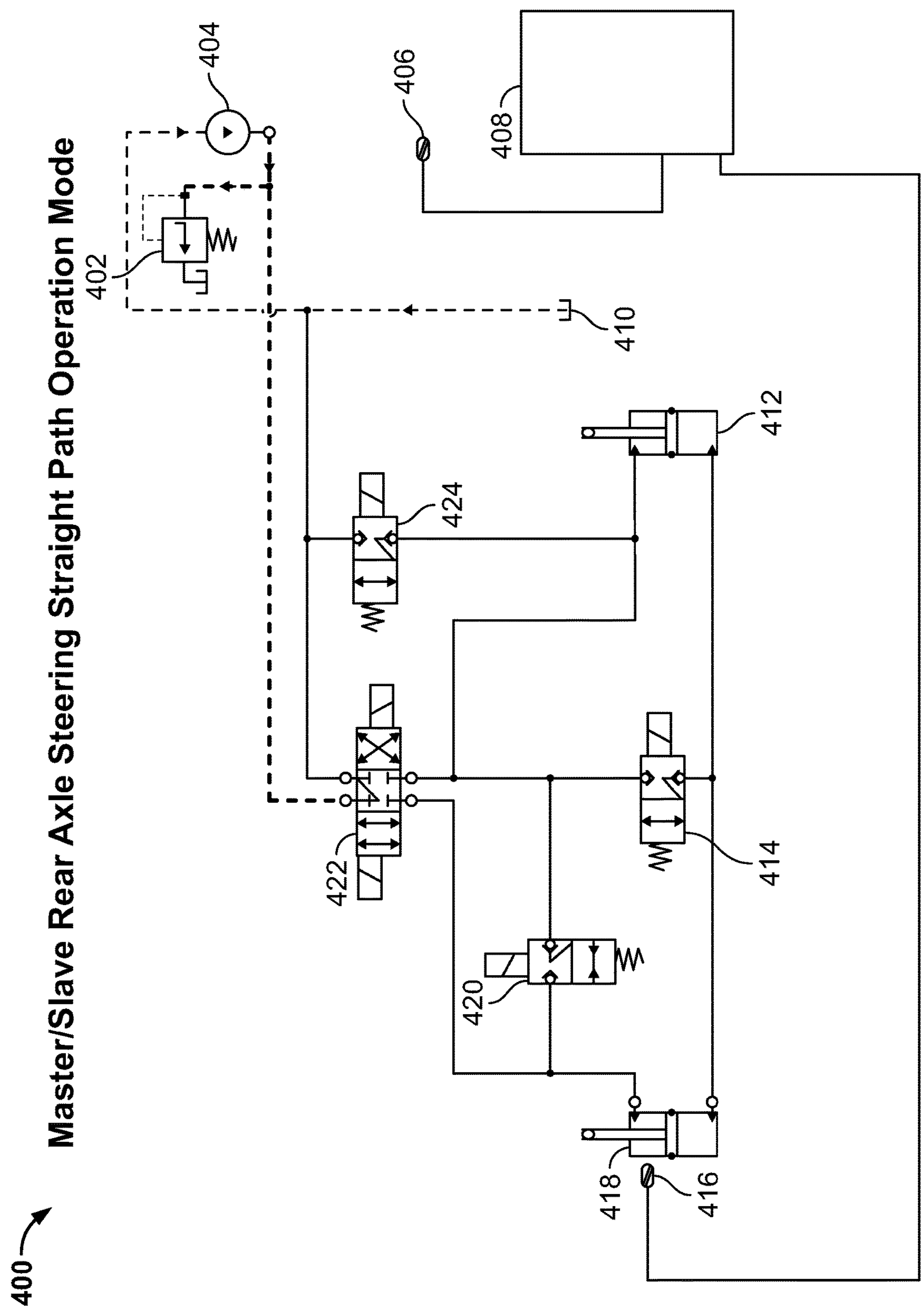
FIG. 21 is the hydraulic circuit of FIG. 19 in a straight path operation mode.

FIG. 21 is the hydraulic circuit 400 in a straight path operation mode. The steering proportional directional valve 422 is centered with the steering cylinders 412, 418 centered (e.g., partially extended). Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 22:
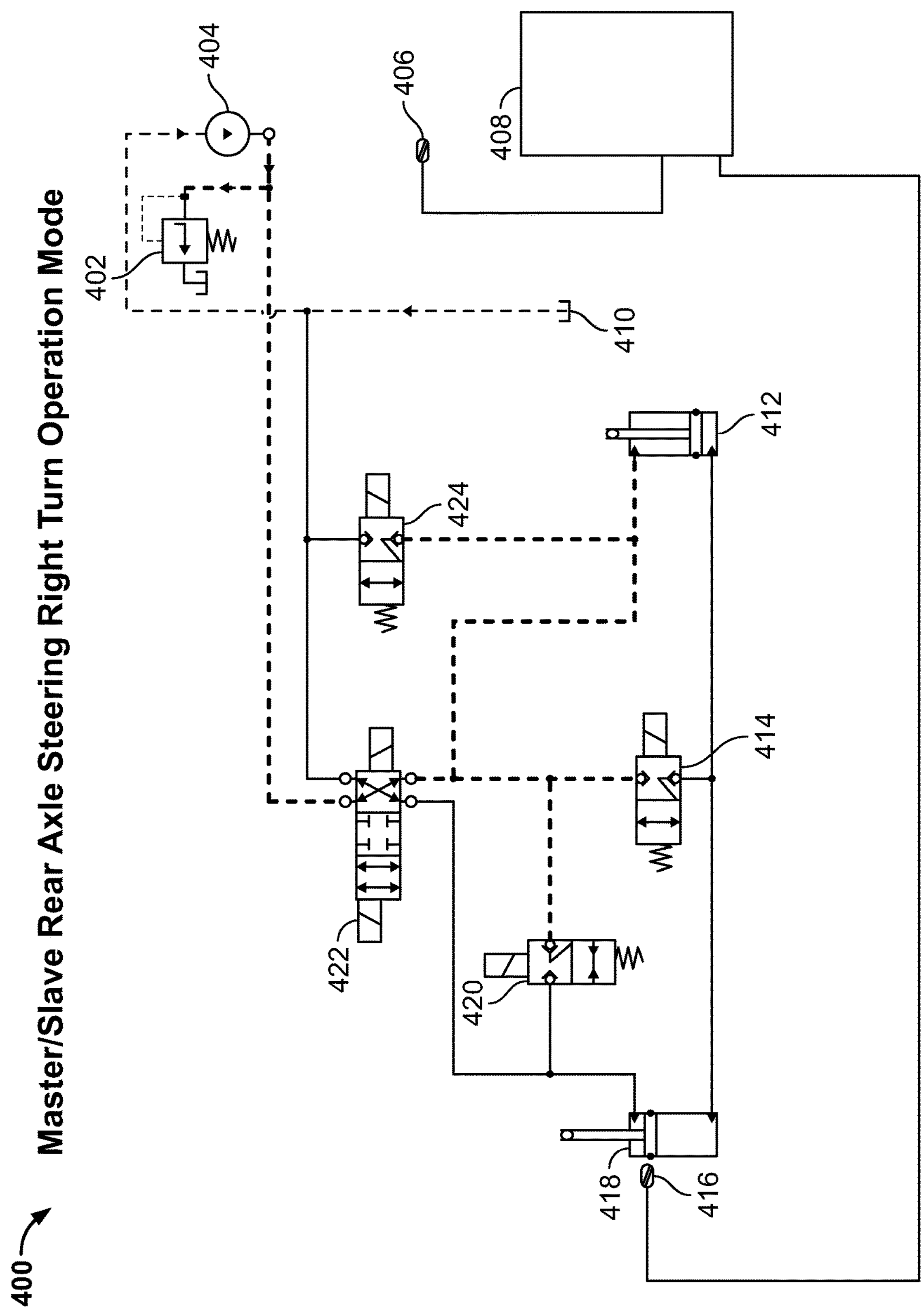
FIG. 22 is the hydraulic circuit of FIG. 19 in a right turn operation mode.

FIG. 22 is the hydraulic circuit 400 in a right turn operation mode. The steering proportional directional valve 422 is shifted to retract the steering cylinder 412 which, in turn, extends the steering cylinder 418, resulting in the windrower 100 turning right. Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 23:
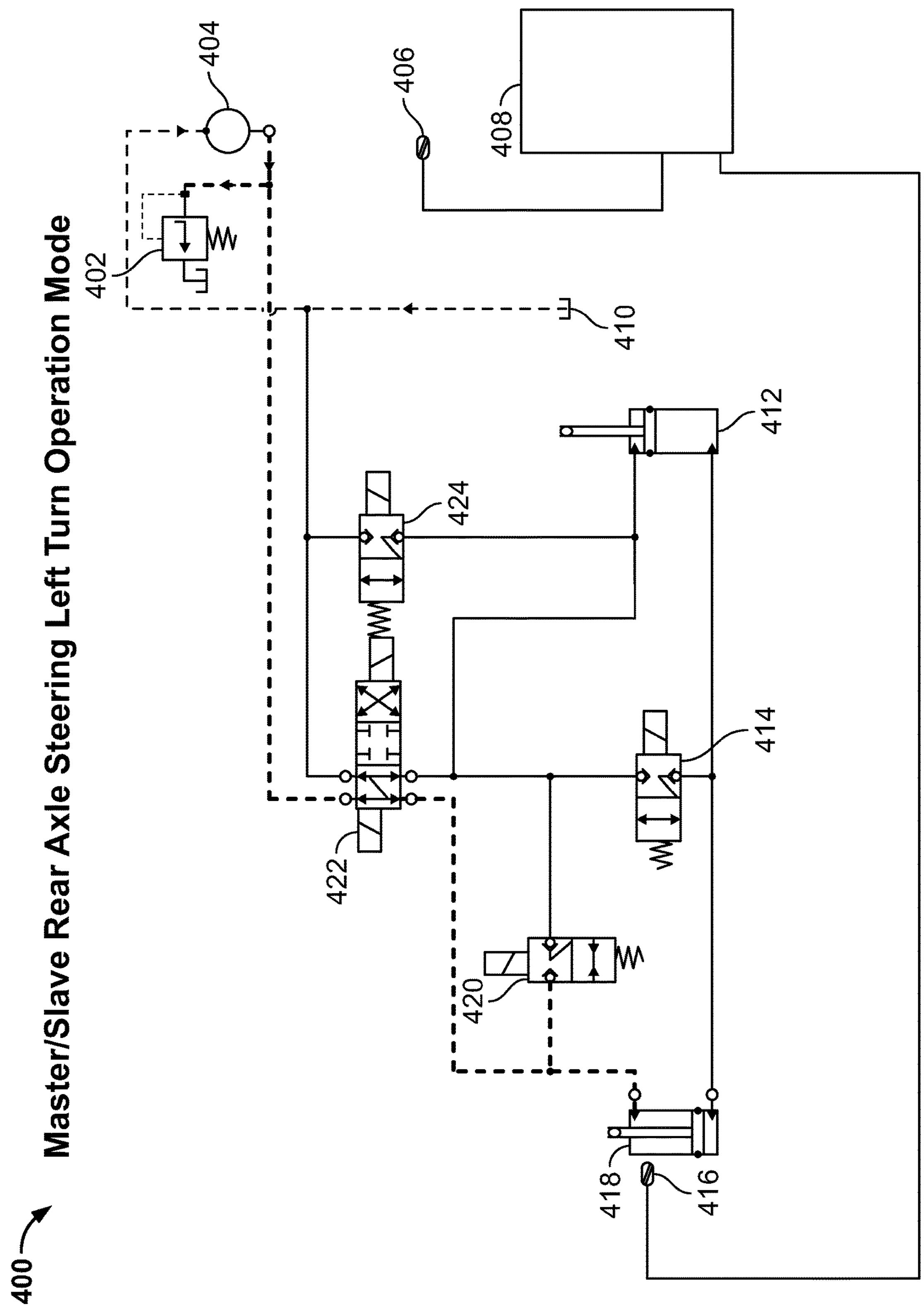
FIG. 23 is the hydraulic circuit of FIG. 19 in a left turn operation mode.

FIG. 23 is the hydraulic circuit 400 in a left turn operation mode. The steering proportional directional valve 422 is shifted to retract the steering cylinder 418 which, in turn, extends the steering cylinder 412, resulting in the windrower 100 turning left. Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 24:
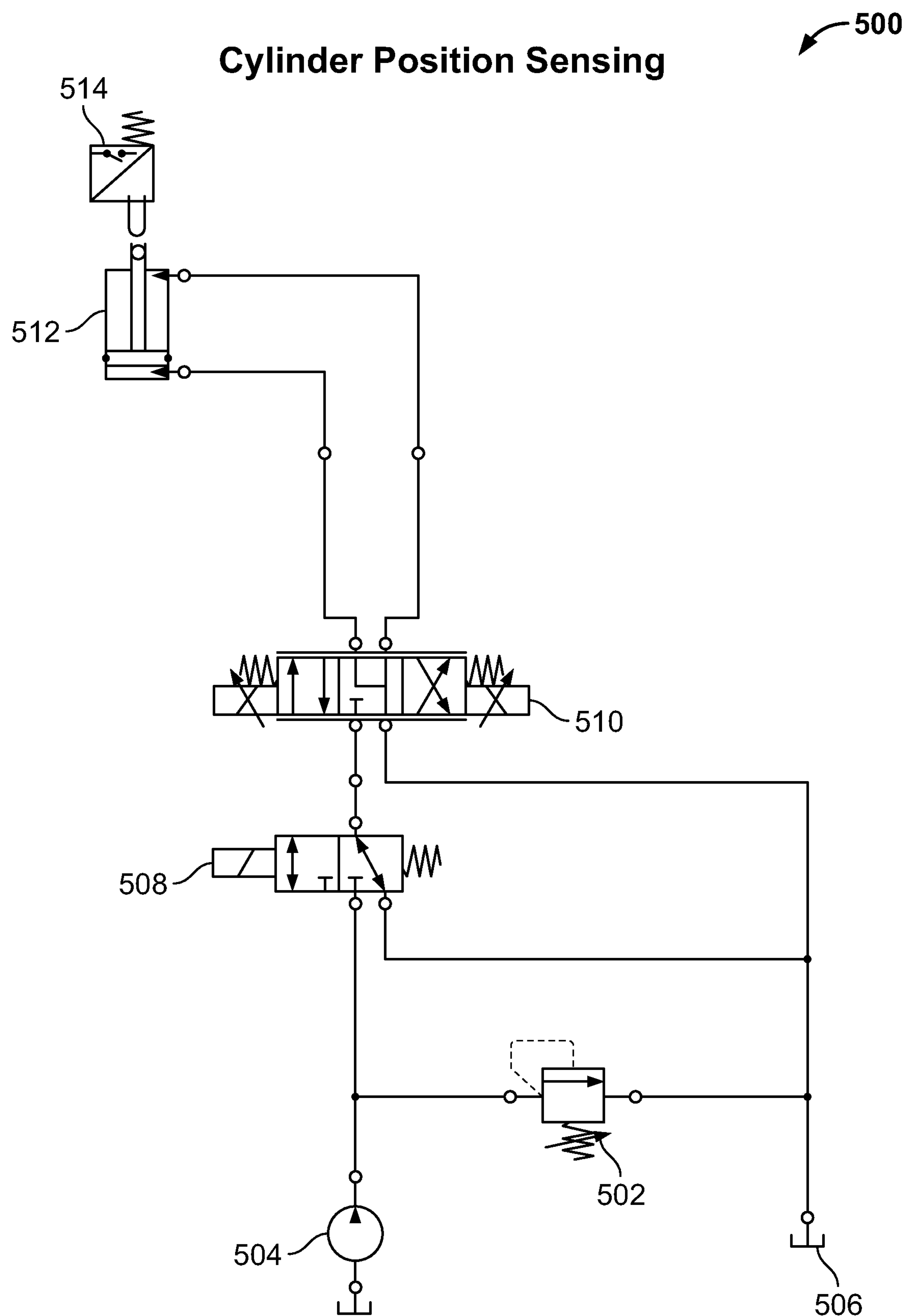
FIG. 24 is a static image of a hydraulic circuit of an exemplary steering control system of the present disclosure.

FIG. 24 is a static image of an alternate hydraulic circuit 500 of the steering control system 130. The hydraulic circuit 500 includes a relief valve 502, a steering pump 504, and a tank 506. The hydraulic circuit 500 includes a return to tank blocking valve 508, and a steering proportional directional valve 510. The hydraulic circuit 500 includes a steering cylinder 512 and a cylinder position sensor 514.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A steering control system for a harvester, comprising:

a first cylinder configured to be coupled to a rear axle of the harvester at one end and rigidly coupled to an upright shaft of a first caster of the harvester at an opposing end;

a sensor associated with the first cylinder and in communication with a controller, the sensor detecting a position of the first cylinder; and a damper configured for extension and retraction and to be coupled to the rear axle of the harvester at one end and an upright shaft of a second caster of the harvester at an opposing end;

wherein in a road operation mode, the first cylinder is actuated by the controller to extend or retract to control steering of the first caster, and the sensor transmits data to the controller regarding the detected position of the first cylinder; and wherein the damper is free of sensing and provides passive damping to the second caster.

2. The steering control system of claim 1, wherein one end of the first cylinder is configured to be coupled to the rear axle of the harvester by a flange.

3. The steering control system of claim 1, wherein the first cylinder is hydraulically plumbed to a steering proportional valve for actuation of the first cylinder to extend or retract.

4. The steering control system of claim 3, wherein the steering proportional valve is hydraulically plumbed to a rod end and a barrel end of the first cylinder.

5. The steering control system of claim 1, wherein the detected position of the first cylinder is representative of a position of the first caster relative to the rear axle of the harvester.

6. The steering control system of claim 1, comprising a proximity sensor configured to detect a position of the first caster relative to the rear axle of the harvester.

7. The steering control system of claim 1, wherein centering of second caster is unaffected by actuation of the first cylinder to extend or retract.

8. The steering control system of claim 1, wherein the sensor is at least one of an internal position sensor, an external position sensor, or a potentiometer.

9. The steering control system of claim 1, wherein in a field operation mode, free flow of hydraulic fluid into and out of the first cylinder provides passive damping by the first cylinder to the first caster.

10. A steering control system for a harvester, comprising:

a first cylinder configured to be coupled to a rear axle of the harvester at one end and rigidly coupled to an upright shaft of a first caster of the harvester at an opposing end;

a sensor associated with the first cylinder and in communication with a controller, the sensor detecting a position of the first cylinder; and a second cylinder configured to be coupled to the rear axle of the harvester at one end and an upright shaft of a second caster of the harvester at an opposing end;

wherein in a road operation mode, the first cylinder is actuated by the controller to extend or retract to control steering of the first caster, and the sensor transmits data to the controller regarding the detected position of the first cylinder; and wherein the second cylinder is free of sensing and is hydraulically coupled to the first cylinder to move in an equal and opposite direction of the first cylinder to control steering of the second caster.

11. The steering control system of claim 10, wherein barrel ports of the first and second cylinders are hydraulically coupled together, and rod ports of the first and second cylinders are hydraulically coupled to a steering proportional valve.

12. The steering control system of claim 11, actuation of the first cylinder to retract displaces fluid from a barrel end of the first cylinder into a barrel end of the second cylinder.

13. The steering control system of claim 12, wherein displacement of the fluid into the barrel end of the second cylinder actuates the second cylinder to extend in an equal magnitude to retraction of the first cylinder.

14. The steering control system of claim 10, wherein the detected position of the first cylinder is representative of a position of the first and second casters relative to the rear axle of the harvester.

15. The steering control system of claim 10, comprising a proximity sensor configured to detect a position of the first caster or second caster relative to the rear axle of the harvester.

16. The steering control system of claim 10, wherein the sensor is at least one of an internal position sensor, an external position sensor, or a potentiometer.

17. The steering control system of claim 10, wherein in a field operation mode, free flow of hydraulic fluid into and out of the first and second cylinders provides passive damping by the first cylinder to the first caster and the second cylinder to the second caster.

18. A harvester, comprising:

a frame;

at least one front axle comprising first and second front wheels pivotally mounted to the front axle;

at least one rear axle comprising first and second casters pivotally mounted to the rear axle; and a steering control system comprising:

a first cylinder coupled to the rear axle at one end and rigidly coupled to an upright shaft of the first caster at an opposing end;

a sensor associated with the first cylinder and in communication with a controller, the sensor detecting a position of the first cylinder; and a damper configured for extension and retraction and coupled to the rear axle at one end and an upright shaft of the second caster at an opposing end;

wherein in a road operation mode, the first cylinder is actuated by the controller to extend or retract to control steering of the first caster, and the sensor transmits data to the controller regarding the detected position of the first cylinder; and wherein the damper is free of sensing and provides passive damping to the second caster.

19. The harvester of claim 18, wherein castering of second caster is unaffected by actuation of the first cylinder to extend or retract.

20. A harvester, comprising:

a frame;

at least one front axle comprising first and second front wheels pivotally mounted to the front axle;

at least one rear axle comprising first and second casters pivotally mounted to the rear axle; and a steering control system comprising:

a first cylinder coupled to the rear axle at one end and rigidly coupled to an upright shaft of the first caster at an opposing end;

a sensor associated with the first cylinder and in communication with a controller, the sensor detecting a position of the first cylinder; and a second cylinder coupled to the rear axle at one end and an upright shaft of the second caster at an opposing end;

wherein in a road operation mode, the first cylinder is actuated by the controller to extend or retract to control steering of the first caster, and the sensor transmits data to the controller regarding the detected position of the first cylinder; and wherein the second cylinder is free of sensing and is hydraulically coupled to the first cylinder to move in an equal and opposite direction of the first cylinder to control steering of the second caster.

* * * * *